United States Patent
Nomura

(10) Patent No.: US 10,095,011 B2
(45) Date of Patent: Oct. 9, 2018

(54) ZOOM LENS SYSTEM

(71) Applicant: RICOH IMAGING COMPANY, LTD., Tokyo (JP)

(72) Inventor: Yoichi Nomura, Saitama (JP)

(73) Assignee: RICOH IMAGING COMPANY, LTD., Tokyo (JP)

(*) Notice: Subject to any disclaimer, the term of this patent is extended or adjusted under 35 U.S.C. 154(b) by 0 days.

(21) Appl. No.: 15/652,624

(22) Filed: Jul. 18, 2017

(65) Prior Publication Data

US 2018/0081155 A1 Mar. 22, 2018

(30) Foreign Application Priority Data

Sep. 16, 2016 (JP) .................. 2016-181399

(51) Int. Cl.
*G02B 15/14* (2006.01)
*G02B 15/167* (2006.01)
*G02B 15/177* (2006.01)

(52) U.S. Cl.
CPC ......... *G02B 15/167* (2013.01); *G02B 15/177* (2013.01)

(58) Field of Classification Search
CPC .................. G02B 15/167; G02B 15/177
See application file for complete search history.

(56) References Cited

U.S. PATENT DOCUMENTS

| | | | |
|---|---|---|---|
| 2007/0103795 A1 | 5/2007 | Saori | |
| 2008/0165428 A1 | 7/2008 | Arimoto et al. | |
| 2008/0198475 A1 | 8/2008 | Arimoto et al. | |
| 2010/0046074 A1* | 2/2010 | Wada | G02B 15/173 359/557 |
| 2012/0307129 A1 | 12/2012 | Kai et al. | |
| 2013/0050844 A1 | 2/2013 | Li | |
| 2013/0201370 A1 | 8/2013 | Hatada | |

FOREIGN PATENT DOCUMENTS

| | | |
|---|---|---|
| JP | 2005-181556 | 7/2005 |
| JP | 2006-259016 | 9/2006 |
| JP | 2007-127989 | 5/2007 |
| JP | 2007-133138 | 5/2007 |
| JP | 2008-89990 | 4/2008 |
| JP | 2008-89991 | 4/2008 |
| JP | 2009-42261 | 2/2009 |
| JP | 2012-252278 | 12/2012 |
| JP | 2013-44795 | 3/2013 |
| JP | 2013-44995 | 3/2013 |
| JP | 2013-160944 | 8/2013 |
| JP | 2016-114800 | 6/2016 |

* cited by examiner

*Primary Examiner* — Joseph P Martinez

(74) *Attorney, Agent, or Firm* — Greenblum & Bernstein, P.L.C.

(57) ABSTRACT

A zoom lens system includes a positive first lens group, a negative second lens group, a positive third lens group and a positive fourth lens group, in that order from the object side, wherein distances between adjacent lens groups thereof change during zooming. The third lens group includes a positive first sub-lens group, a positive second sub-lens group and a negative third sub-lens group. The third sub-lens group consists of a single negative lens element. The following conditions (1) and (2) are satisfied:

$$6.0 < f1Gp/fw < 9.0 \qquad (1), \text{ and}$$

$$1.3 < f3Gp/f4Gp < 2.0 \qquad (2),$$

wherein fw designates the focal length of the entire zoom lens system at the short focal length extremity, f1Gp, f3Gp and f4Gp designate the focal lengths of the first, third and fourth lens groups, respectively.

17 Claims, 31 Drawing Sheets

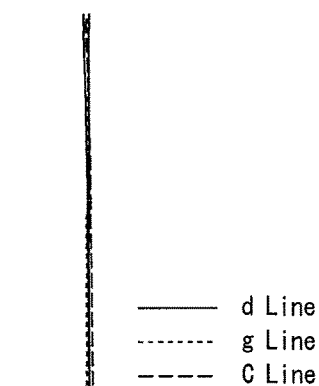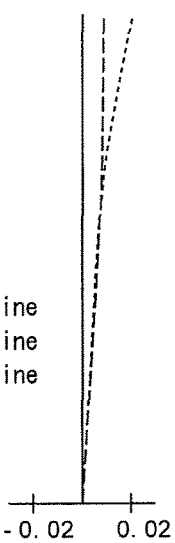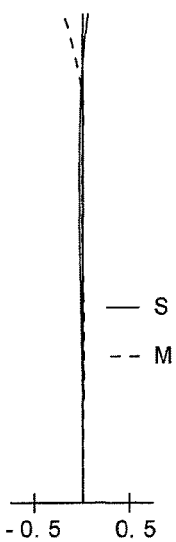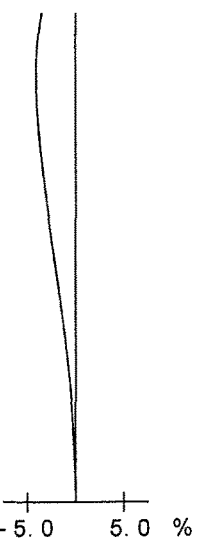
Fig.3A FNO.=1:2.88 — SPHERICAL ABERRATION CHROMATIC ABERRATION (d Line, g Line, C Line)
Fig.3B Y=14.24 — LATERAL CHROMATIC ABERRATION
Fig.3C Y=14.24 — ASTIGMATISM (S, M)
Fig.3D Y=14.24 — DISTORTION
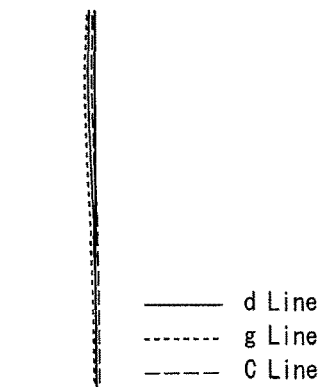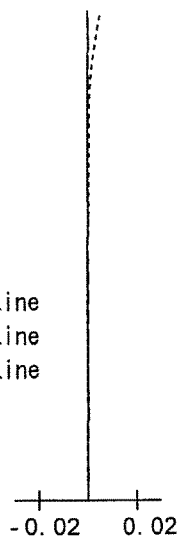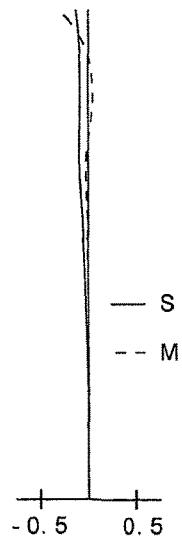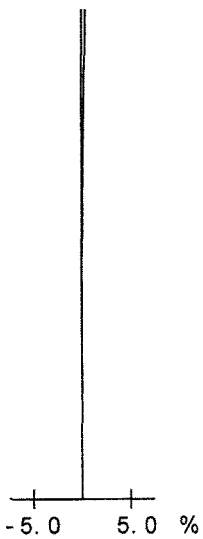
Fig.4A FNO.=1:2.88 — SPHERICAL ABERRATION CHROMATIC ABERRATION (d Line, g Line, C Line)
Fig.4B Y=14.24 — LATERAL CHROMATIC ABERRATION
Fig.4C Y=14.24 — ASTIGMATISM (S, M)
Fig.4D Y=14.24 — DISTORTION

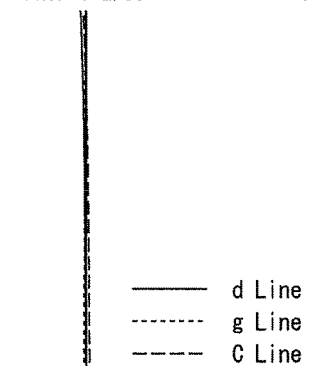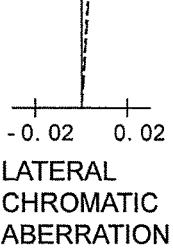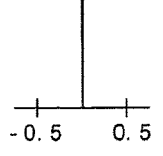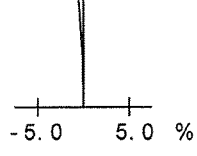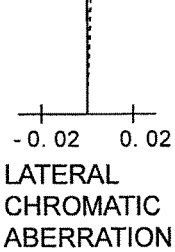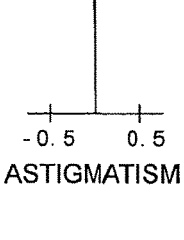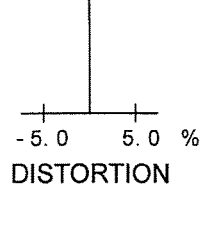

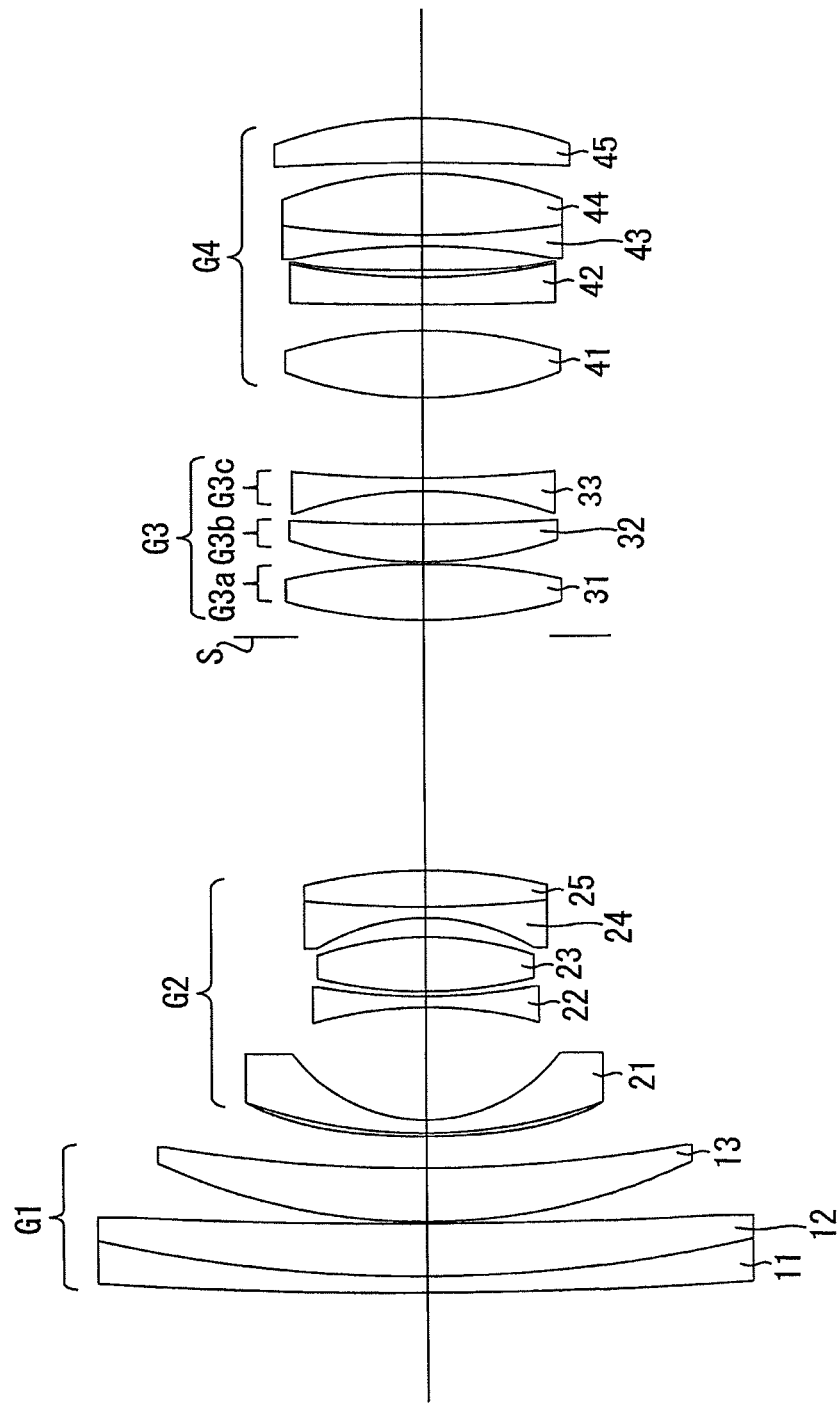

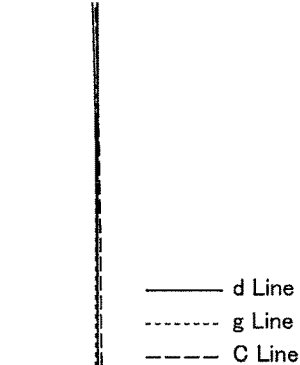
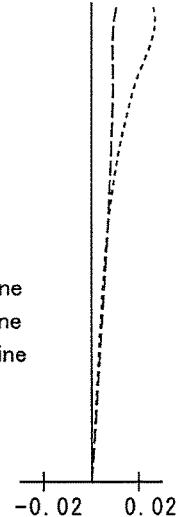
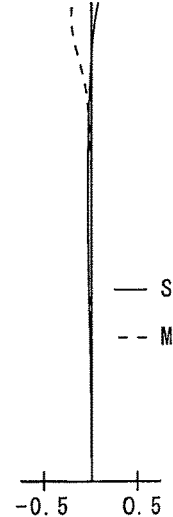
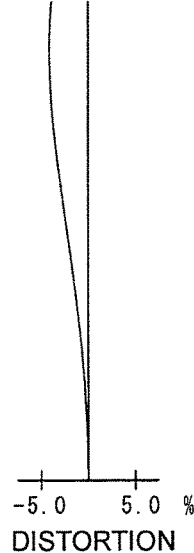
Fig.11A  Fig.11B  Fig.11C  Fig.11D
SPHERICAL ABERRATION CHROMATIC ABERRATION | LATERAL CHROMATIC ABERRATION | ASTIGMATISM | DISTORTION
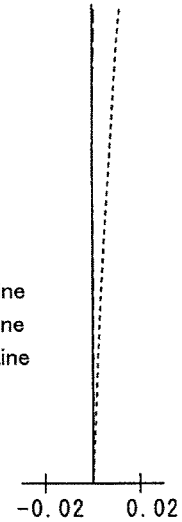
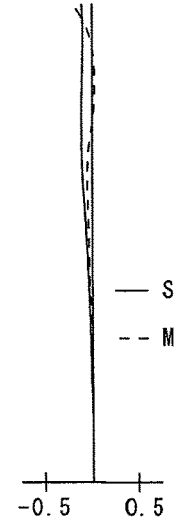
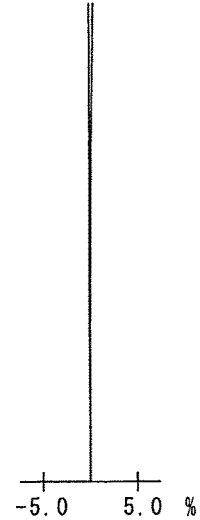
Fig.12A  Fig.12B  Fig.12C  Fig.12D
SPHERICAL ABERRATION CHROMATIC ABERRATION | LATERAL CHROMATIC ABERRATION | ASTIGMATISM | DISTORTION

FNO.=1:2.88

-0.5　0.5
SPHERICAL
ABERRATION
CHROMATIC
ABERRATION

— d Line
---- g Line
---- C Line

Y=14.24

-0.02　0.02
LATERAL
CHROMATIC
ABERRATION

Y=14.24

— S
-- M

-0.5　0.5
ASTIGMATISM

Y=14.24

-5.0　5.0 %
DISTORTION

FNO.=1:2.88

— d Line
---- g Line
---- C Line

-0.5　0.5
SPHERICAL
ABERRATION
CHROMATIC
ABERRATION

Y=14.24

-0.02　0.02
LATERAL
CHROMATIC
ABERRATION

Y=14.24

— S
-- M

-0.5　0.5
ASTIGMATISM

Y=14.24

-5.0　5.0 %
DISTORTION

FNO.=1:2.88

―― d Line
········ g Line
― ― ― C Line

-0.5  0.5
SPHERICAL
ABERRATION
CHROMATIC
ABERRATION

Y=14.24

-0.02  0.02
LATERAL
CHROMATIC
ABERRATION

Y=14.24

―― S
― ― M

-0.5  0.5
ASTIGMATISM

Y=14.24

-5.0  5.0 %
DISTORTION

FNO.=1:2.88

―― d Line
········ g Line
― ― ― C Line

-0.5  0.5
SPHERICAL
ABERRATION
CHROMATIC
ABERRATION

Y=14.24

-0.02  0.02
LATERAL
CHROMATIC
ABERRATION

Y=14.24

―― S
― ― M

-0.5  0.5
ASTIGMATISM

Y=14.24

-5.0  5.0 %
DISTORTION

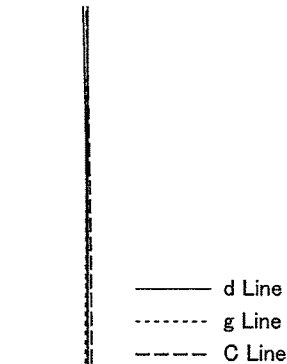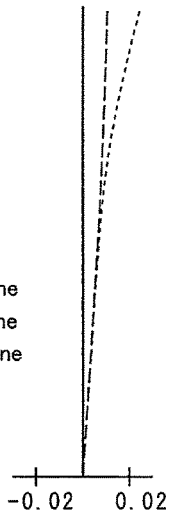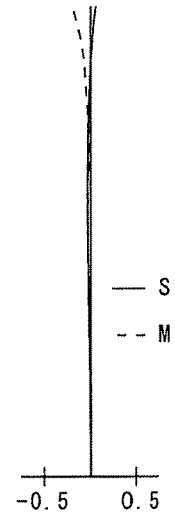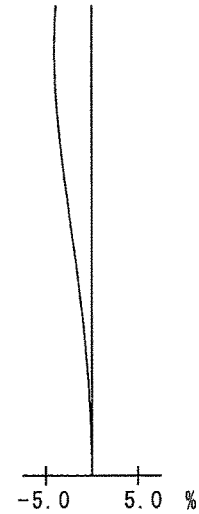
Fig.23A  FNO.=1:2.88
Fig.23B  Y=14.24
Fig.23C  Y=14.24
Fig.23D  Y=14.24
—— d Line
------ g Line
— — C Line
—— S
- - M
-0.5  0.5
SPHERICAL ABERRATION CHROMATIC ABERRATION
-0.02  0.02
LATERAL CHROMATIC ABERRATION
-0.5  0.5
ASTIGMATISM
-5.0  5.0 %
DISTORTION
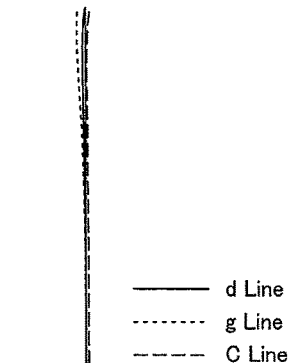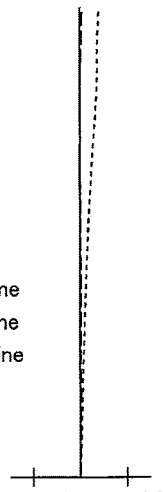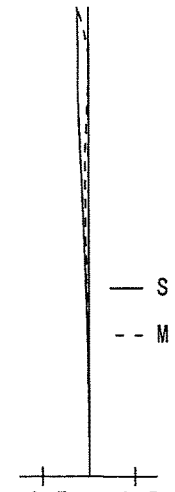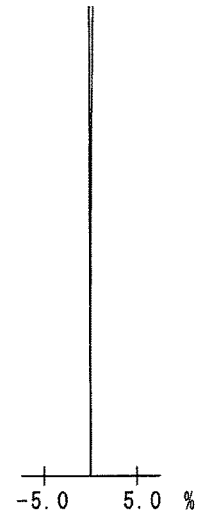
Fig.24A  FNO.=1:2.88
Fig.24B  Y=14.24
Fig.24C  Y=14.24
Fig.24D  Y=14.24
—— d Line
------ g Line
— — C Line
—— S
- - M
-0.5  0.5
SPHERICAL ABERRATION CHROMATIC ABERRATION
-0.02  0.02
LATERAL CHROMATIC ABERRATION
-0.5  0.5
ASTIGMATISM
-5.0  5.0 %
DISTORTION

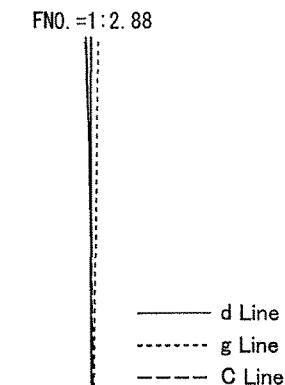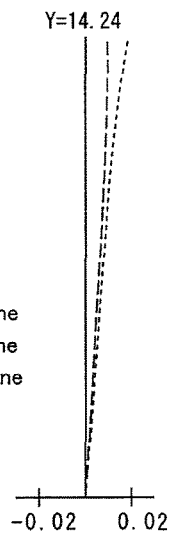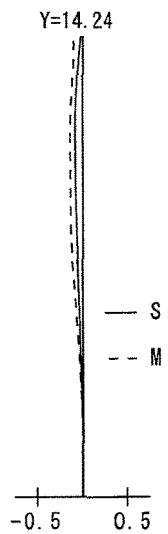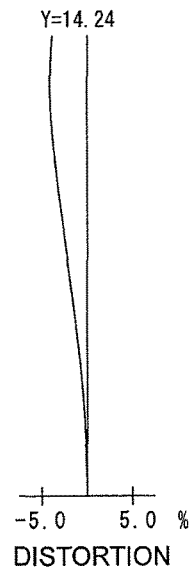
Fig.27A  Fig.27B  Fig.27C  Fig.27D
SPHERICAL ABERRATION CHROMATIC ABERRATION | LATERAL CHROMATIC ABERRATION | ASTIGMATISM | DISTORTION
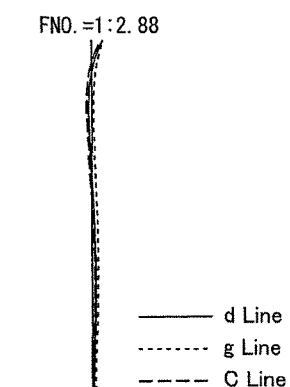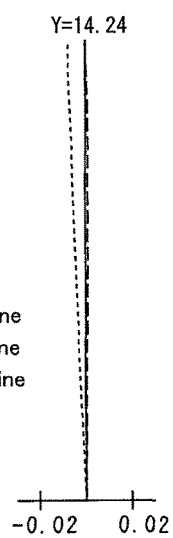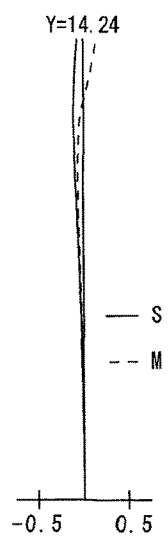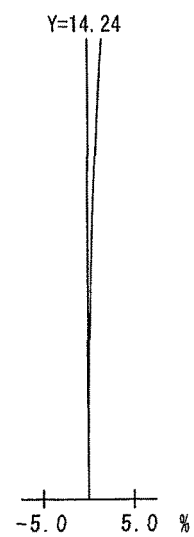
Fig.28A  Fig.28B  Fig.28C  Fig.28D
SPHERICAL ABERRATION CHROMATIC ABERRATION | LATERAL CHROMATIC ABERRATION | ASTIGMATISM | DISTORTION

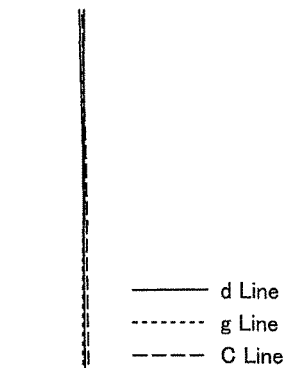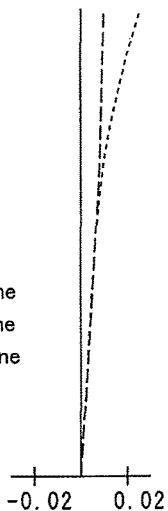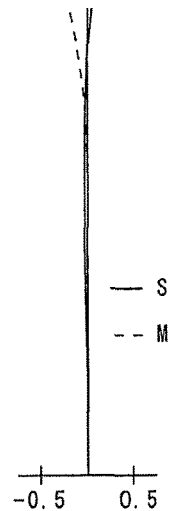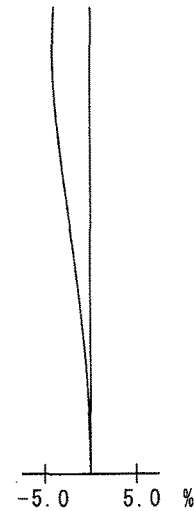
Fig.31A  FNO.=1:2.88
SPHERICAL ABERRATION CHROMATIC ABERRATION
Fig.31B  Y=14.24
LATERAL CHROMATIC ABERRATION
Fig.31C  Y=14.24
ASTIGMATISM
Fig.31D  Y=14.24
DISTORTION
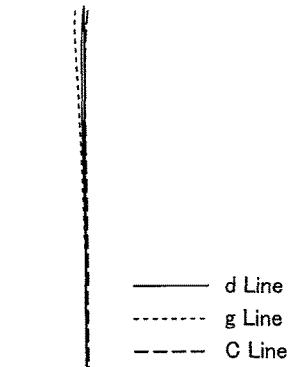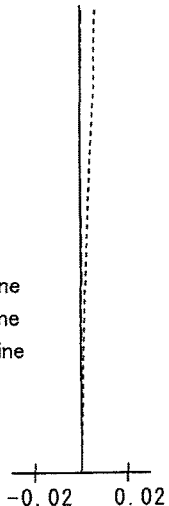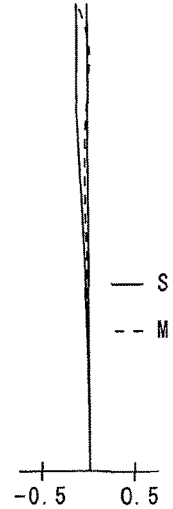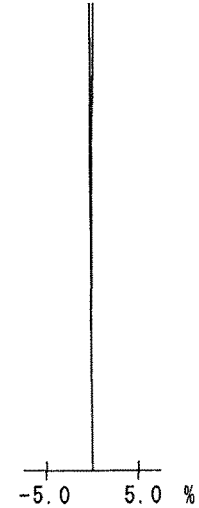
Fig.32A  FNO.=1:2.88
SPHERICAL ABERRATION CHROMATIC ABERRATION
Fig.32B  Y=14.24
LATERAL CHROMATIC ABERRATION
Fig.32C  Y=14.24
ASTIGMATISM
Fig.32D  Y=14.24
DISTORTION FNO.=1:2.88
——— d Line
········ g Line
———— C Line
-0.5  0.5
SPHERICAL
ABERRATION
CHROMATIC
ABERRATION

Y=14.24
-0.02  0.02
LATERAL
CHROMATIC
ABERRATION

Y=14.24
——— S
— — M
-0.5  0.5
ASTIGMATISM

Y=14.24
-5.0  5.0 %
DISTORTION

FNO.=1:2.88
——— d Line
········ g Line
———— C Line
-0.5  0.5
SPHERICAL
ABERRATION
CHROMATIC
ABERRATION

Y=14.24
-0.02  0.02
LATERAL
CHROMATIC
ABERRATION

Y=14.24
——— S
— — M
-0.5  0.5
ASTIGMATISM

Y=14.24
-5.0  5.0 %
DISTORTION

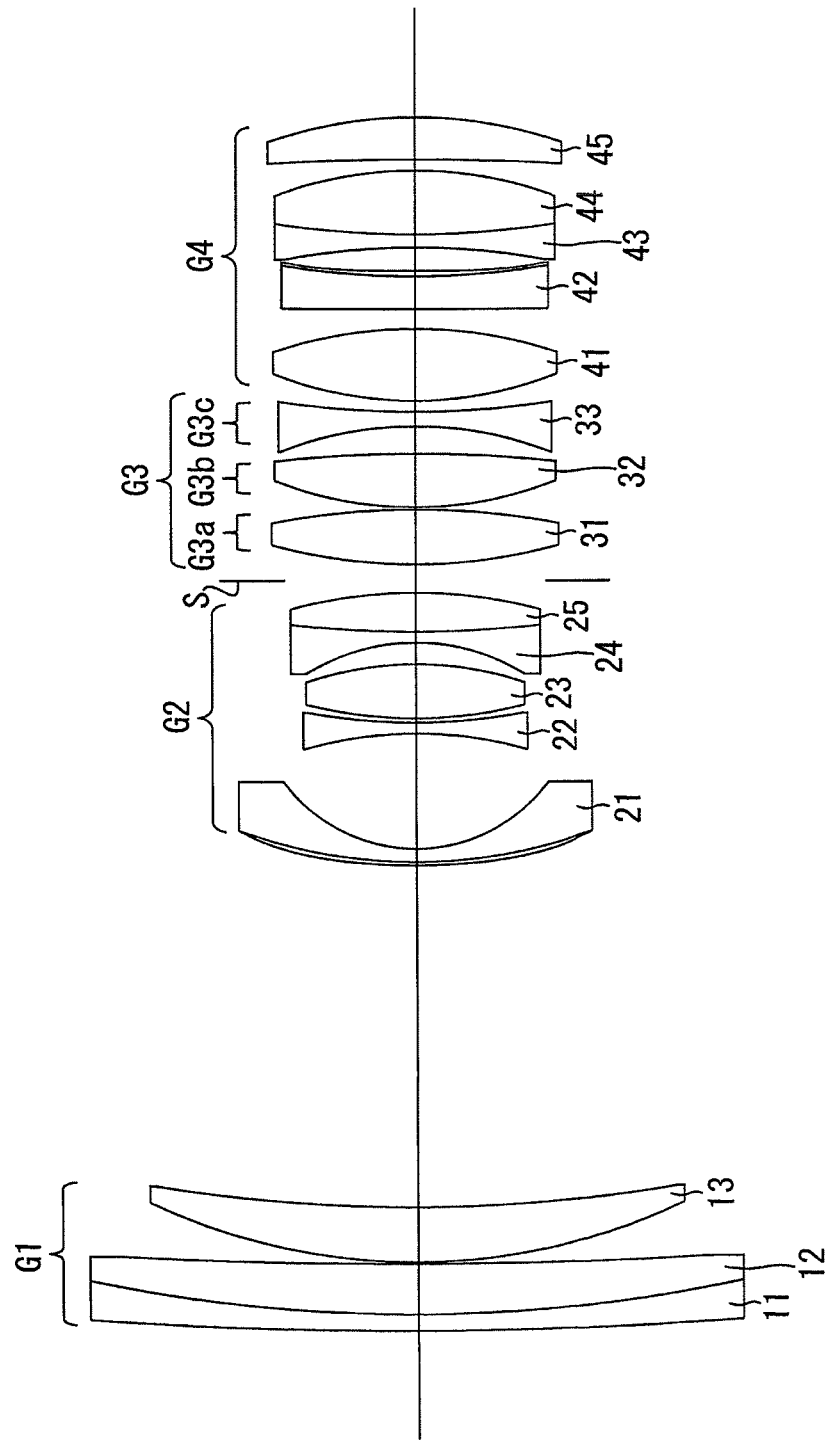

Fig.39A
FNO.=1:2.88
—— d Line
········ g Line
— — — C Line
-0.5　0.5
SPHERICAL
ABERRATION
CHROMATIC
ABERRATION Fig.39B
Y=14.24
-0.02　0.02
LATERAL
CHROMATIC
ABERRATION Fig.39C
Y=14.24
—— S
— — M
-0.5　0.5
ASTIGMATISM Fig.39D
Y=14.24
-5.0　5.0 %
DISTORTION Fig.40A
FNO.=1:2.88
—— d Line
········ g Line
— — — C Line
-0.5　0.5
SPHERICAL
ABERRATION
CHROMATIC
ABERRATION Fig.40B
Y=14.24
-0.02　0.02
LATERAL
CHROMATIC
ABERRATION Fig.40C
Y=14.24
—— S
— — M
-0.5　0.5
ASTIGMATISM Fig.40D
Y=14.24
-5.0　5.0 %
DISTORTION

ZOOM LENS SYSTEM

BACKGROUND OF THE INVENTION

1. Field of the Invention

The present invention relates to a zoom lens system, and relates to, e.g., a zoom lens system that is suitable for installation in an imaging apparatus such as a digital camera, etc.

2. Description of Related Art

Various types of large-aperture standard zoom lens systems, which include a wide-angle capability in particular, for use in SLR (Single-Lens Reflex) digital cameras are known in the related art. Out of such zoom lens systems, typically a zoom lens system configured of a positive lens group, a negative lens group, a positive lens group and a positive lens group (four lens groups) is used as a large-aperture standard zoom lens system, in which the zoom ratio is approximately 3:1 (Patent Literature 1 through 3).

On the other hand, in a digital SLR camera, due to high pixelization of the image sensor thereof, the sense of resolution is high over the entire focal length range, so that an optical system having a high image flatness is demanded. In order to meet such demands, correction of various aberrations such as chromatic aberration and field curvature, etc., is necessary. In regard to chromatic aberration, although in recent years it has become possible to correct lateral chromatic aberration to a certain extent by performing image processing on the photographed image using software in-built into the camera or by using software installed in a computer, in order to achieve an optical quality having a higher sense of resolution, it has been a technical problem to sufficiently reduce axial chromatic aberration. Furthermore, field curvature and axial chromatic aberration are difficult aberrations to correct via image processing in an after-process.

Zoom lens systems of the related art are disclosed in the following:

Patent Literature 1: Japanese Unexamined Patent Publication No. 2012-252278

Patent Literature 2: Japanese Unexamined Patent Publication No. 2007-127989

Patent Literature 3: Japanese Unexamined Patent Publication No. 2007-133138

However, in Patent Literature 1 through 3 (zoom lens systems), since correction of various aberrations such as chromatic aberration is insufficient, the optical quality thereof is not enough for digital SLR cameras that have high pixelization.

SUMMARY OF THE INVENTION

The present invention has been devised in view of the above mentioned problems, and provides a zoom lens system that achieves a superior optical quality by favorably correcting various aberrations such as chromatic aberration, etc.

According to an aspect of the present invention, a zoom lens system is provided, including a positive first lens group, a negative second lens group, a positive third lens group and a positive fourth lens group, in that order from the object side, wherein distances between adjacent lens groups thereof change during zooming. The third lens group includes a positive first sub-lens group, a positive second sub-lens group and a negative third sub-lens group, in that order from the object side. The third sub-lens group includes a single negative lens element. The following conditions (1) and (2) are satisfied:

$$6.0 < f1Gp/fw < 9.0 \quad (1), \text{ and}$$

$$1.3 < f3Gp/f4Gp < 2.0 \quad (2),$$

wherein fw designates the focal length of the entire zoom lens system at the short focal length extremity, f1Gp designates the focal length of the first lens group, f3Gp designates the focal length of the third lens group, and f4Gp designates the focal length of the fourth lens group.

It is desirable for the first sub-lens group to include a single positive lens element, and the second sub-lens group to include a single positive lens element.

It is desirable for the first sub-lens group to include a cemented lens having a positive lens element and a negative lens element, and for the second sub-lens group to include a single positive lens element.

It is desirable for the following condition (3) to be satisfied:

$$0.95 < f3Ga/|f3Gc| < 2.5 \quad (3),$$

wherein f3Ga designates the focal length of the first sub-lens group, and f3Gc designates the focal length of the third sub-lens group.

It is desirable for the following condition (4) to be satisfied:

$$7.5 < f1Gp/|f2Gp| < 10.0 \quad (4),$$

wherein f1Gp designates the focal length of the first lens group, and f2GP designates the focal length of the second lens group.

It is desirable for the third lens group to include at least one positive lens element that is provided with at least one aspherical surface thereon.

It is desirable for the following condition (5) to be satisfied:

$$vd3gp\text{-max} > 80 \quad (5),$$

wherein vd3gp-max designates the Abbe number with respect to the d-line of the positive lens element that has the maximum Abbe number with respect to the d-line out of the third lens group.

It is desirable for the following condition (6) to be satisfied:

$$vd4gp\text{-max} > 80 \quad (6),$$

wherein vd4gp-max designates the Abbe number with respect to the d-line of the positive lens element that has the maximum Abbe number with respect to the d-line out of the fourth lens group.

It is desirable for the second lens group to include a negative lens element having a concave surface on the image side, a biconcave negative lens element, a biconvex positive lens element, and a cemented lens having a biconcave negative lens element and a biconvex positive lens element, in that order from the object side.

In an embodiment, a zoom lens system is provided, including a positive first lens group, a negative second lens group, a positive third lens group and a positive fourth lens group, in that order from the object side, wherein distances between adjacent lens groups thereof change during zooming. The third lens group includes a positive first sub-lens group, a positive second sub-lens group and a negative third sub-lens group, in that order from the object side. The third sub-lens group includes a single negative lens element. The following conditions (1) and (3) are satisfied:

$$6.0 < f1Gp/fw < 9.0 \quad (1), \text{ and}$$

$$0.95 < f3Ga/|f3Gc| < 2.5 \quad (3),$$

wherein fw designates the focal length of the entire zoom lens system at the short focal length extremity, f1Gp designates the focal length of the first lens group, f3Ga designates the focal length of the first sub-lens group, and f3Gc designates the focal length of the third sub-lens group.

It is desirable for the first sub-lens group to include a single positive lens element, and the second sub-lens group to include a single positive lens element.

It is desirable for the first sub-lens group to include a cemented lens having a positive lens element and a negative lens element, and the second sub-lens group to include a single positive lens element.

It is desirable for the following condition (4) to be satisfied:

$$7.5 < f1Gp/|f2Gp| < 10.0 \quad (4),$$

wherein f1Gp designates the focal length of the first lens group, and f2GP designates the focal length of the second lens group.

It is desirable for the third lens group to include at least one positive lens element that is provided with at least one aspherical surface thereon.

It is desirable for the following condition (5) to be satisfied:

$$vd3gp\text{-max} > 80 \quad (5),$$

wherein vd3gp-max designates the Abbe number with respect to the d-line of the positive lens element that has the maximum Abbe number with respect to the d-line out of the third lens group.

It is desirable for the following condition (6) to be satisfied:

$$vd4gp\text{-max} > 80 \quad (6),$$

wherein vd4gp-max designates the Abbe number with respect to the d-line of the positive lens element that has the maximum Abbe number with respect to the d-line out of the fourth lens group.

It is desirable for the second lens group to include a negative lens element having a concave surface on the image side, a biconcave negative lens element, a biconvex positive lens element, and a cemented lens having a biconcave negative lens element and a biconvex positive lens element, in that order from the object side.

According to the present invention, a zoom lens system can be provided that achieves a superior optical quality by favorably correcting various aberrations such as chromatic aberration, etc.

The present disclosure relates to subject matter contained in Japanese Patent Application No. 2016-181399 (filed on Sep. 16, 2016) which is expressly incorporated herein in its entirety.

BRIEF DESCRIPTION OF THE DRAWINGS

The present invention will be discussed below in detail with reference to the accompanying drawings, in which:

FIGS. 3A, 3B, 3C and 3D show various aberrations that occurred in the zoom lens system of FIG. 1;

FIGS. 4A, 4B, 4C and 4D show various aberrations that occurred in the zoom lens system of FIG. 2;

FIGS. 7A, 7B, 7C and 7D show various aberrations that occurred in the zoom lens system of FIG. 5;

FIGS. 8A, 8B, 8C and 8D show various aberrations that occurred in the zoom lens system of FIG. 6;

FIG. 9 shows a lens arrangement of a third numerical embodiment of a zoom lens system, according to the present invention, when focused on an object at infinity at the short focal length extremity;

FIGS. 11A, 11B, 11C and 11D show various aberrations that occurred in the zoom lens system of FIG. 9;

FIGS. 12A, 12B, 12C and 12D show various aberrations that occurred in the zoom lens system of FIG. 10;

FIGS. 23A, 23B, 23C and 23D show various aberrations that occurred in the zoom lens system of FIG. 21;

FIGS. 24A, 24B, 24C and 24D show various aberrations that occurred in the zoom lens system of FIG. 22;

FIGS. 27A, 27B, 27C and 27D show various aberrations that occurred in the zoom lens system of FIG. 25;

FIGS. 28A, 28B, 28C and 28D show various aberrations that occurred in the zoom lens system of FIG. 26;

FIGS. 31A, 31B, 31C and 31D show various aberrations that occurred in the zoom lens system of FIG. 29;

FIGS. 32A, 32B, 32C and 32D show various aberrations that occurred in the zoom lens system of FIG. 30;

FIG. 38 shows a lens arrangement of the tenth numerical embodiment of a zoom lens system, according to the present invention, when focused on an object at infinity at the long focal length extremity;

FIGS. 39A, 39B, 39C and 39D show various aberrations that occurred in the zoom lens system of FIG. 37;

FIGS. 40A, 40B, 40C and 40D show various aberrations that occurred in the zoom lens system of FIG. 38;

DESCRIPTION OF THE EMBODIMENTS

Figure 41:
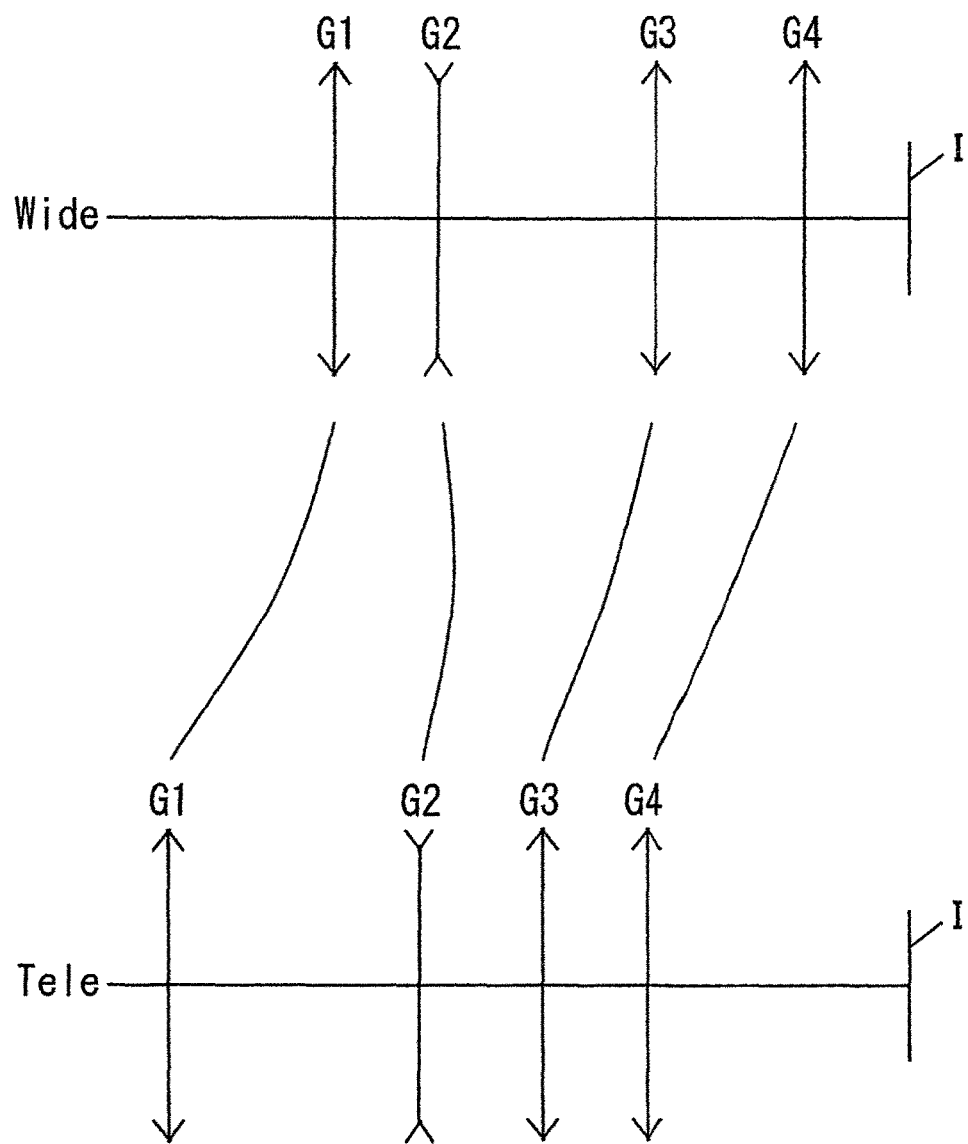
FIG. 41 shows a zoom path of the zoom lens system according to the present invention.

In each of the first through tenth numerical embodiments, the zoom lens system of the present invention is configured of a positive first lens group G1, a negative second lens group G2, a positive third lens group G3, and a positive fourth lens group G4, in that order from the object side, as shown in the zoom path in FIG. 41. "I" designates a predetermined imaging plane.

In each of the first through tenth numerical embodiments, upon the zoom lens system of the present invention zooming from the short focal length extremity (Wide) to the long focal length extremity (Tele), the first lens group G1, the third lens group G3 and the fourth lens group G4 move toward the object side, and the second lens group G2 first moves toward the image side and thereafter returns toward the object side ("U-turns"), as shown in the zoom path in FIG. 41. Accordingly, the distance between the first lens group G1 and the second lens group G2 increases, the distance between the second lens group G2 and the third lens group G3 decreases, and the distance between the third lens group G3 and the fourth lens group G4 decreases. However, there is a certain degree of freedom in the behavior of each lens group during zooming; various modifications are possible providing that the distances between adjacent lens groups change during zooming.

In each of the first through tenth numerical embodiments, the first lens group G1 is configured of a negative lens element 11, a positive lens element 12 and a positive lens element 13, in that order from the object side. The negative lens element 11 and the positive lens element 12 are cemented to each other.

In each of the first through tenth numerical embodiments, the second lens group G2 is configured of a negative lens element 21, a negative lens element 22, a positive lens element 23, a negative lens element 24 and a positive lens element 25, in that order from the object side. The negative lens element 21 is a hybrid lens that is configured of a glass lens element having a synthetic resin aspherical surface layer adhered to the surface on the object side thereof. The negative lens element 24 and the positive lens element 25 are cemented to each other.

In each of the first through tenth numerical embodiments, the third lens group G3 is configured of a positive first sub-lens group G3a, a positive second sub-lens group G3b, and a negative third sub-lens group G3c, in that order from the object side.

In each of the first through fourth, seventh, ninth and tenth numerical embodiments, the third lens group G3 (the first sub-lens group G3a, the second sub-lens group G3b and the third sub-lens group G3c) are configured in the following manner.

The first sub-lens group G3a is configured of a single positive lens element 31. In the second, third, ninth and tenth numerical embodiments, the single positive lens element 31 is provided with an aspherical surface on the image side.

The second sub-lens group G3b is configured of a positive single lens element 32. In the fourth and seventh numerical embodiments, the positive single lens element 32 is provided with an aspherical surface on the image side.

The third sub-lens group G3c is configured of a negative single lens element 33.

In each of the fifth, sixth and eighth numerical embodiments, the third lens group G3 (the first sub-lens group G3a, the second sub-lens group G3b and the third sub-lens group G3c) are configured in the following manner.

The first sub-lens group G3a is configured of a cemented lens having a negative lens element 31' and a positive lens element 32', in that order from the object side. The positive lens element 32' is provided with an aspherical surface on the image side.

The second sub-lens group G3b is configured of a single positive lens element 33'.

The third sub-lens group G3c is configured of a single negative lens element 34'.

In each of the first through third, fifth, sixth, and eighth through tenth numerical embodiments, the fourth lens group G4 is configured of a positive lens element 41, a negative lens element 42, a negative lens element 43, a positive lens element 44, and a positive lens element 45, in that order from the object side. The negative lens element 42 is a hybrid lens that is configured of a glass lens element having a synthetic resin aspherical surface layer adhered to the surface on the image side thereof. The negative lens element 43 and the positive lens element 44 are cemented to each other.

In each of the fourth and seventh numerical embodiments, the fourth lens group G4 is configured of a positive lens element 41', a negative lens element 42', a positive lens element 43' and a positive lens element 44', in that order from the object side. The negative lens element 42' and the positive lens element 43' are cemented to each other. The positive lens element 44' is provided with an aspherical surface on each side thereof.

The zoom lens system of the present invention can employ, e.g., a positive-lead zoom lens system configured of a positive lens group, a negative lens group, a positive lens group and a positive lens group, in that order from the object side (four lens groups), and is for a large-aperture standard zoom lens system that includes a wide-angle capability. In the zoom lens system of the present invention, by determining an optimal power balance between each lens group, various aberrations (spherical aberration, coma, astigmatism, field curvature and chromatic aberration, etc.) can be favorably corrected over the entire focal length range (entire zooming range), thereby achieving an optical quality having superior image flatness.

In the zoom lens system of the present invention, the third lens group G3 is configured of a positive first sub-lens group G3$a$, a positive second sub-lens group G3$b$ and a negative third sub-lens group G3$c$, in that order from the object side. The third sub-lens group G3$c$ is configured of either the negative single lens element 33 or 34'. Chromatic aberration can be favorably corrected by providing at least one specialized low-dispersion lens element (ED lens) in the first sub-lens group G3$a$ and/or the second sub-lens group G3$b$. Furthermore, an optimal balance between spherical aberration, coma and astigmatism over the entire focal length (zooming range) can be achieved by including at least one positive lens element having an aspherical surface, on at least one side thereof, in the first sub-lens group G3$a$ and/or the second sub-lens group G3$b$.

Condition (1) specifies the ratio of the focal length of the entire zoom lens system at the short focal length extremity to the focal length of the first lens group G1. By satisfying condition (1), the movement of the first lens group G1 during zooming can be suppressed while reducing the overall length of the zoom lens system at the long focal length extremity, and axial chromatic aberration, spherical aberration and coma can be favorably corrected.

If the upper limit of condition (1) is exceeded, the movement of the first lens group G1 during zooming becomes too great, so that the overall length of the zoom lens system at the long focal length extremity becomes long. Furthermore, correction of axial chromatic aberration becomes difficult.

If the lower limit of condition (1) is exceeded, the refractive power of the first lens group G1 becomes too strong, so that large amounts of spherical aberration and coma occur, especially at the long focal length extremity.

Condition (2) specifies the ratio of the focal length of the third lens group G3 to the focal length of the fourth lens group G4. By satisfying condition (2), a desired backfocus can be easily obtained, and coma, spherical aberration and distortion can be favorably corrected. Moreover, deterioration in the optical quality due to decentration of the lens groups can be prevented.

If the upper limit of condition (2) is exceeded, the refractive power of the fourth lens group G4 becomes too strong, so that a large amount of peripheral coma occurs at the short focal length extremity, and correction thereof becomes difficult.

If the lower limit of condition (2) is exceeded, the refractive power of the third lens group G3 becomes too strong, so that correction of spherical aberration becomes difficult, and it becomes difficult to achieve a desired backfocus; if the refractive power of the second lens group G2 is strengthened in order to overcome such problems, a large amount of distortion at the short focal length extremity occurs.

If the upper limit or lower limit of condition (2) is exceeded, considerable deterioration in the optical quality occurs due to decentration of the lens groups.

Condition (3) specifies the ratio of the focal length of the first sub-lens group G3$a$ to the focal length of the third sub-lens group G3$c$. By satisfying condition (3), field curvature, spherical aberration, coma and astigmatism can be favorably corrected.

If the upper limit of condition (3) is exceeded, the refractive power of the third sub-lens group G3$c$ becomes too strong, so that it becomes difficult to maintain the balance of the field curvature over the entire focal length range (zooming range). Furthermore, it becomes difficult to favorably correct spherical aberration, coma and astigmatism.

If the lower limit of condition (3) is exceeded, the refractive power of the first sub-lens group G3$a$ becomes too strong, so that it becomes difficult to correct spherical aberration at the long focal length extremity side.

Condition (4) specifies the ratio of the focal length of the first lens group G1 to the focal length of the second lens group G2. By satisfying condition (4), miniaturization of the optical system (shortening of the entire length of the zoom lens system) can be achieved while favorably correcting astigmatism, distortion, spherical aberration and coma.

If the upper limit of condition (4) is exceeded, large amounts of astigmatism and distortion occur, especially at the short focal length extremity. Furthermore, since the amount of movement of the first lens group G1 along the optical axis during zooming increases, miniaturization of the zoom lens system (shortening of the entire length of the zoom lens system) becomes difficult.

If the lower limit of condition (4) is exceeded, it becomes difficult to correct spherical aberration and coma, especially at the long focal length extremity.

Condition (5) specifies the Abbe number with respect to the d-line of the positive lens element that has the maximum Abbe number with respect to the d-line out of the third lens group G3. By including a low-dispersion positive lens element that satisfies condition (5) within the third lens group G3, chromatic aberration (axial chromatic aberration) can be favorably corrected over the entire focal length range (zooming range). If condition (5) is not satisfied, correction of chromatic aberration (axial chromatic aberration) over the entire focal length range (zooming range) becomes difficult.

Condition (6) specifies the Abbe number with respect to the d-line of the positive lens element that has the maximum Abbe number with respect to the d-line out of the fourth lens group G4. By including a low-dispersion positive lens element that satisfies condition (6) within the fourth lens group G4, chromatic aberration (axial chromatic aberration) can be favorably corrected over the entire focal length range (zooming range). If condition (6) is not satisfied, correction of chromatic aberration (axial chromatic aberration) over the entire focal length range (zooming range) becomes difficult.

Embodiments

Specific first through tenth numerical embodiments will be herein discussed. In the various aberration diagrams and the tables, the d-line, g-line and C-line show aberrations at their respective wave-lengths; S designates the sagittal image, M designates the meridional image, FNO. designates the f-number, f designates the focal length of the entire optical system, W designates the half angle of view)(°), Y designates the image height, fB designates the backfocus, L designates the overall length of the lens system, R designates the radius of curvature, d designates the lens thickness or distance between lenses, N(d) designates the refractive index at the d-line, and ν(d) designates the Abbe number with respect to the d-line. The backfocus is the distance from the surface on the side closest to the image side of the zoom lens system to the imaging plane I (FIG. 41). The values for the f-number, the focal length, the half angle-of-view, the image height, the backfocus, the overall length of the lens system, and the distance d between lenses (which changes during zooming) are shown in the following order: short focal length extremity, intermediate focal length, and long focal length extremity. The unit used for the various lengths is defined in millimeters (mm).

An aspherical surface which is rotationally symmetrical about the optical axis is defined as:

$$x = cy^2/(1 + [1 - \{1+K\}c^2y^2]^{1/2}) + A4y^4 + A6y^6 + A8y^8 + A10y^{10} + A12y^{12}$$

wherein 'c' designates the curvature (1/r) of the aspherical vertex, 'y' designates the distance from the optical axis, 'K' designates the conic coefficient, A4 designates a fourth-order aspherical coefficient, A6 designates a sixth-order aspherical coefficient, A8 designates an eighth-order aspherical coefficient, A10 designates a tenth-order aspherical coefficient, A12 designates a twelfth-order aspherical coefficient, and 'x' designates the amount of sag.

Numerical Embodiment 1

Figure 1:
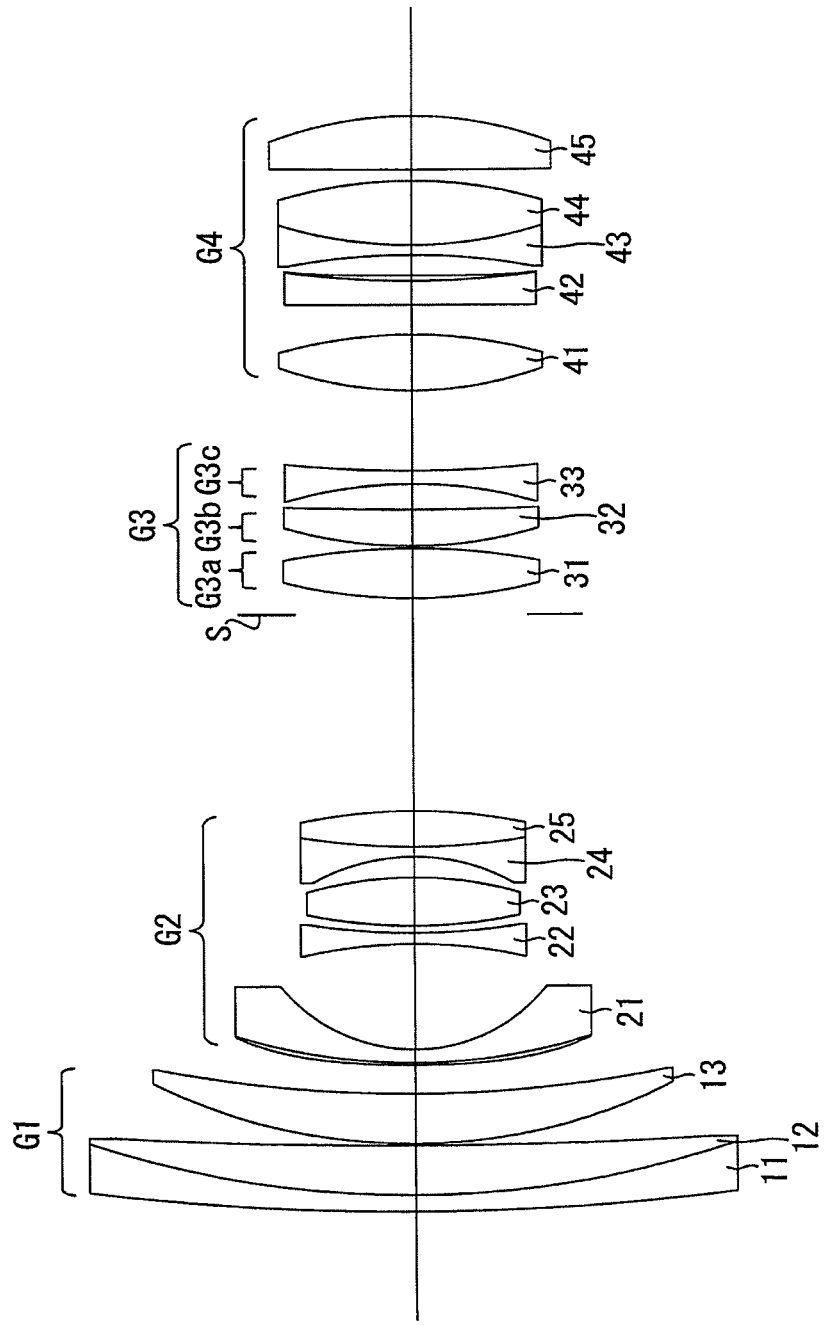
FIG. 1 shows a lens arrangement of a first numerical embodiment of a zoom lens system, according to the present invention, when focused on an object at infinity at the short focal length extremity.
Figure 2:
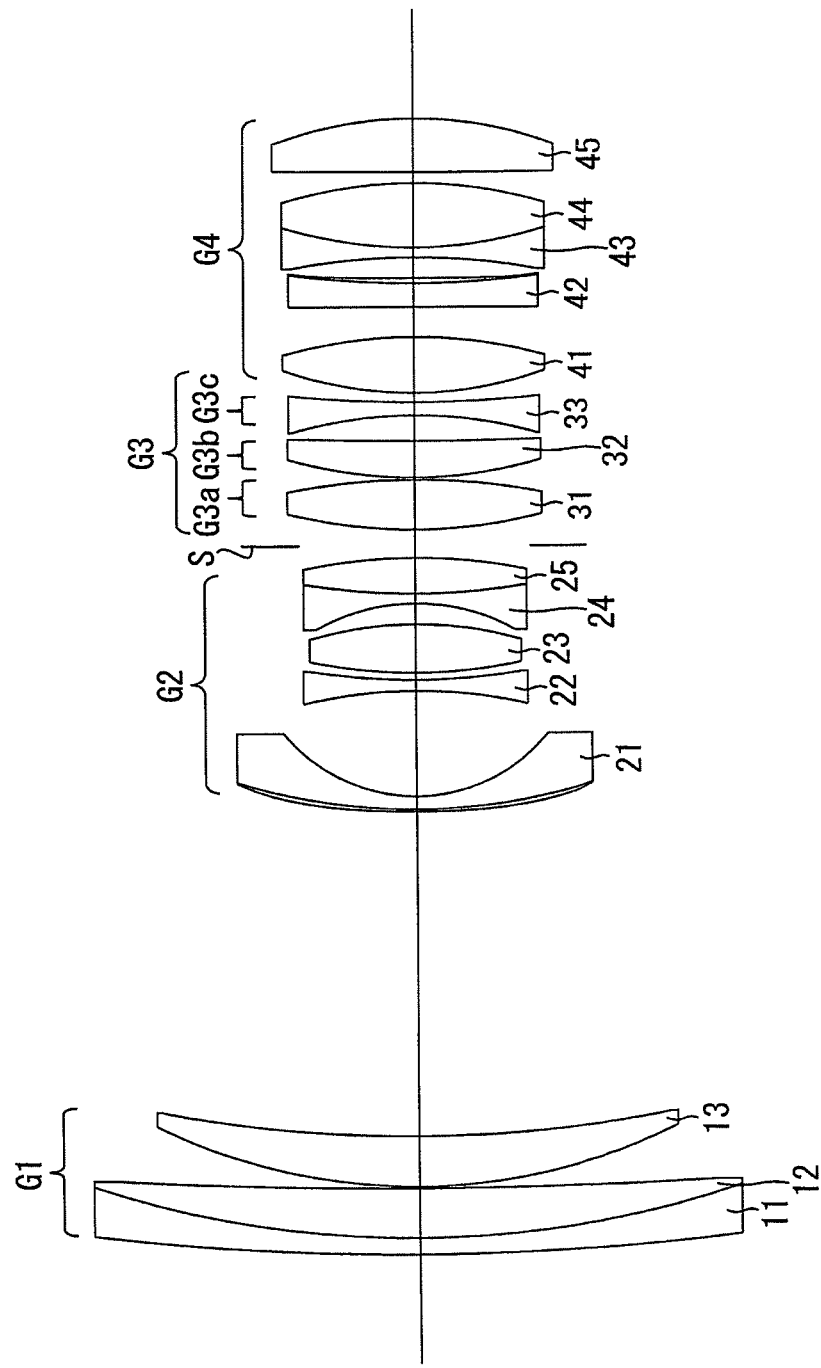
FIG. 2 shows a lens arrangement of the first numerical embodiment of a zoom lens system, according to the present invention, when focused on an object at infinity at the long focal length extremity.

FIGS. 1 through 4D and Tables 1 through 4 disclose a first numerical embodiment of the zoom lens system according to the present invention. FIG. 1 shows a lens arrangement of the first numerical embodiment of the zoom lens system when focused on an object at infinity at the short focal length extremity. FIGS. 3A, 3B, 3C and 3D show various aberrations that occurred in the zoom lens system of FIG. 1. FIG. 2 shows a lens arrangement of the first numerical embodiment of the zoom lens system when focused on an object at infinity at the long focal length extremity. FIGS. 4A, 4B, 4C and 4D show various aberrations that occurred in the zoom lens system of FIG. 2. Table 1 indicates the surface data, Table 2 indicates various lens system data, Table 3 indicates aspherical surface data, and Table 4 indicates lens-group data.

The zoom lens system of the first numerical embodiment is configured of a positive first lens group G1, a negative second lens group G2, a positive third lens group G3, and a positive fourth lens group G4, in that order from the object side. An aperture diaphragm S is provided between the second lens group G2 and the third lens group G3 (immediately in front of the third lens group G3) and moves integrally with the third lens group G3.

The first lens group G1 is configured of a negative meniscus lens element 11 having a convex surface on the object side, a positive meniscus lens element 12 having a convex surface on the object side, and a positive meniscus lens element 13 having a convex surface on the object side, in that order from the object side. The negative meniscus lens element 11 and the positive meniscus lens element 12 are cemented to each other.

The second lens group G2 is configured of a negative meniscus lens element 21 having a convex surface on the object side, a biconcave negative lens element 22, a biconvex positive lens element 23, a biconcave negative lens element 24, and a biconvex positive lens element 25, in that order from the object side. The negative meniscus lens element 21 is a hybrid lens that is configured of a glass lens element having a synthetic resin aspherical surface layer adhered to the surface on the object side thereof. The biconcave negative lens element 24 and the biconvex positive lens element 25 are cemented to each other.

The third lens group G3 is configured of a positive first sub-lens group G3a, a positive second sub-lens group G3b, and a negative third sub-lens group G3c, in that order from the object side. The first sub-lens group G3a is configured of a single biconvex positive lens element 31. The second sub-lens group G3b is configured of a single positive meniscus lens element 32 having a convex surface on the object side. The third sub-lens group G3c is configured of a single biconcave negative lens element 33.

The fourth lens group G4 is configured of a biconvex positive lens element 41, a negative meniscus lens element 42 having a convex surface on the object side, a biconcave negative lens element 43, a biconvex positive lens element 44, and a biconvex positive lens element 45, in that order from the object side. The negative meniscus lens element 42 is a hybrid lens that is configured of a glass lens element having a synthetic resin aspherical surface layer adhered to the surface on the image side thereof. The biconcave negative lens element 43 and the biconvex positive lens element 44 are cemented to each other.

TABLE 1

SURFACE DATA

| Surf. No. | R | d | N(d) | ν(d) |
|---|---|---|---|---|
| 1 | 248.342 | 1.500 | 1.84666 | 23.8 |
| 2 | 95.440 | 4.542 | 1.77250 | 49.6 |
| 3 | 499.141 | 0.150 | | |
| 4 | 54.444 | 4.584 | 1.77250 | 49.6 |
| 5 | 123.687 | d5 | | |
| 6* | 96.321 | 0.200 | 1.52972 | 42.7 |
| 7 | 55.321 | 1.200 | 1.88300 | 40.8 |
| 8 | 15.770 | 9.661 | | |
| 9 | −45.755 | 1.000 | 1.88300 | 40.8 |
| 10 | 61.022 | 0.658 | | |
| 11 | 47.797 | 4.447 | 1.65412 | 39.7 |
| 12 | −34.770 | 1.914 | | |
| 13 | −18.669 | 0.900 | 1.72916 | 54.7 |
| 14 | 62.955 | 3.285 | 1.84666 | 23.8 |
| 15 | −50.625 | d15 | | |
| 16 Diaphragm | ∞ | 1.500 | | |
| 17 | 48.041 | 4.569 | 1.80400 | 46.6 |
| 18 | −61.324 | 0.200 | | |
| 19 | 41.565 | 3.351 | 1.49700 | 81.6 |
| 20 | 358.984 | 2.340 | | |
| 21 | −41.141 | 1.200 | 1.88300 | 40.8 |
| 22 | 114.231 | d22 | | |
| 23 | 36.124 | 5.120 | 1.49700 | 81.6 |
| 24 | −44.979 | 2.737 | | |
| 25 | 9318.559 | 2.179 | 1.84666 | 23.8 |
| 26 | 85.561 | 0.500 | 1.52972 | 42.7 |

TABLE 1-continued

SURFACE DATA

| Surf. No. | R | d | N(d) | ν(d) |
|---|---|---|---|---|
| 27* | −694.915 | 1.882 | | |
| 28 | −61.581 | 0.900 | 1.90366 | 31.3 |
| 29 | 40.782 | 5.900 | 1.49700 | 81.6 |
| 30 | −41.987 | 1.000 | | |
| 31 | 1027.636 | 4.906 | 1.74400 | 44.8 |
| 32 | −36.676 | — | | |

The asterisk (*) designates an aspherical surface which is rotationally symmetrical with respect to the optical axis.

TABLE 2

ZOOM LENS SYSTEM DATA
Zoom Ratio: 2.93

| | Short Focal Length Extremity | Intermediate Focal Length | Long Focal Length Extremity |
|---|---|---|---|
| FNO. | 2.9 | 2.9 | 2.9 |
| f | 16.52 | 28.36 | 48.35 |
| W | 41.8 | 26.7 | 16.3 |
| Y | 14.24 | 14.24 | 14.24 |
| fB | 37.30 | 49.96 | 64.37 |
| L | 137.62 | 148.58 | 168.41 |
| d5 | 2.626 | 15.765 | 29.757 |
| d15 | 17.997 | 7.398 | 1.100 |
| d22 | 7.370 | 3.129 | 0.854 |

TABLE 3

ASPHERICAL SURFACE DATA

| Surf. No. | K | A4 | A6 | A8 |
|---|---|---|---|---|
| 6 | 0.000 | 0.1893E−04 | −0.2609E−07 | 0.7632E−10 |
| 27 | 0.000 | 0.2537E−04 | −0.2027E−08 | 0.5038E−10 |

| Surf. No. | A10 | A12 |
|---|---|---|
| 6 | −0.1299E−12 | 0.3140E−15 |
| 27 | −0.5617E−13 | 0.0000E+00 |

TABLE 4

LENS GROUP DATA

| Lens Group | 1st Surf. | Focal Length |
|---|---|---|
| 1 | 1 | 108.55 |
| 2 | 6 | −14.00 |
| 3 | 17 | 58.27 |
| 4 | 23 | 36.76 |

Numerical Embodiment 2

Figure 5:
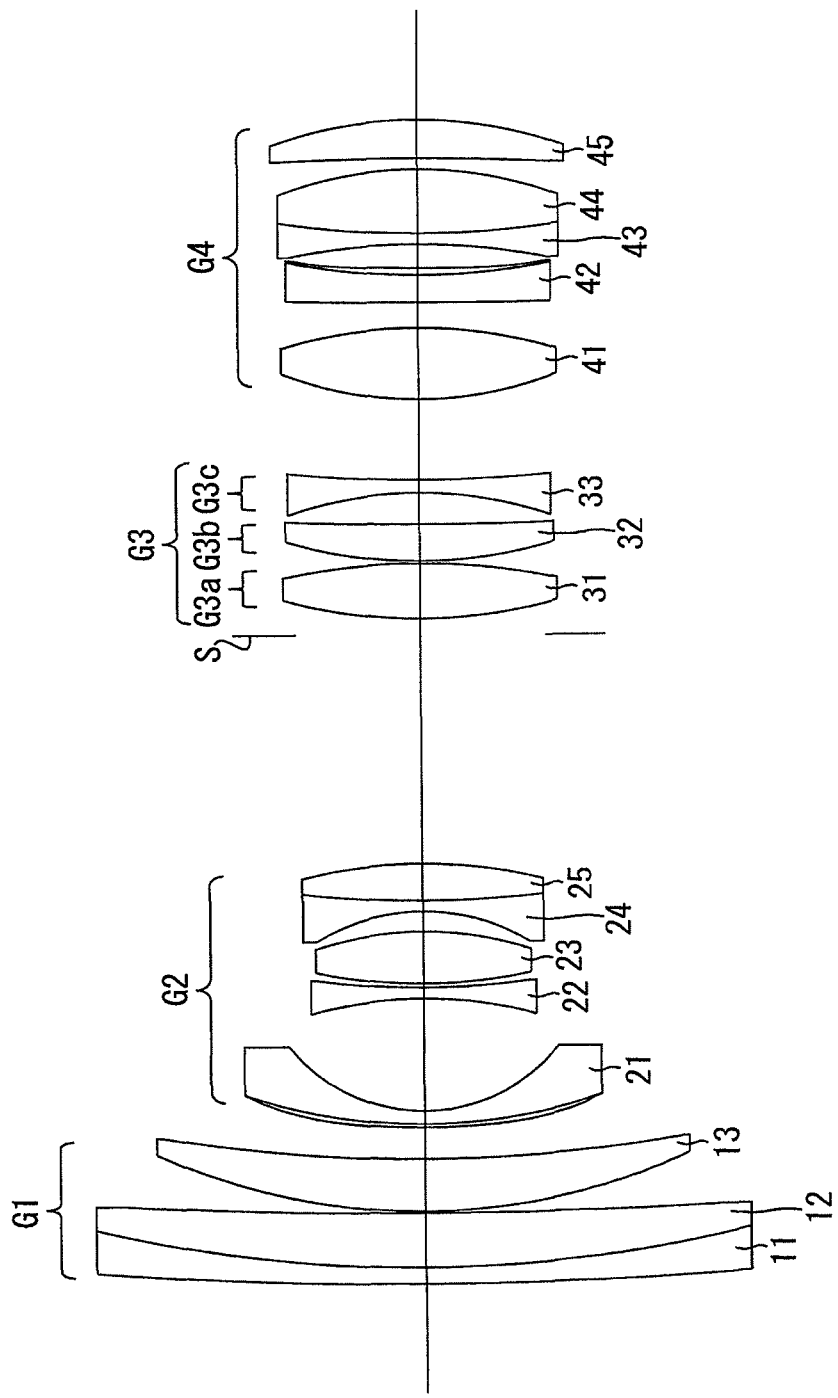
FIG. 5 shows a lens arrangement of a second numerical embodiment of a zoom lens system, according to the present invention, when focused on an object at infinity at the short focal length extremity.
Figure 6:
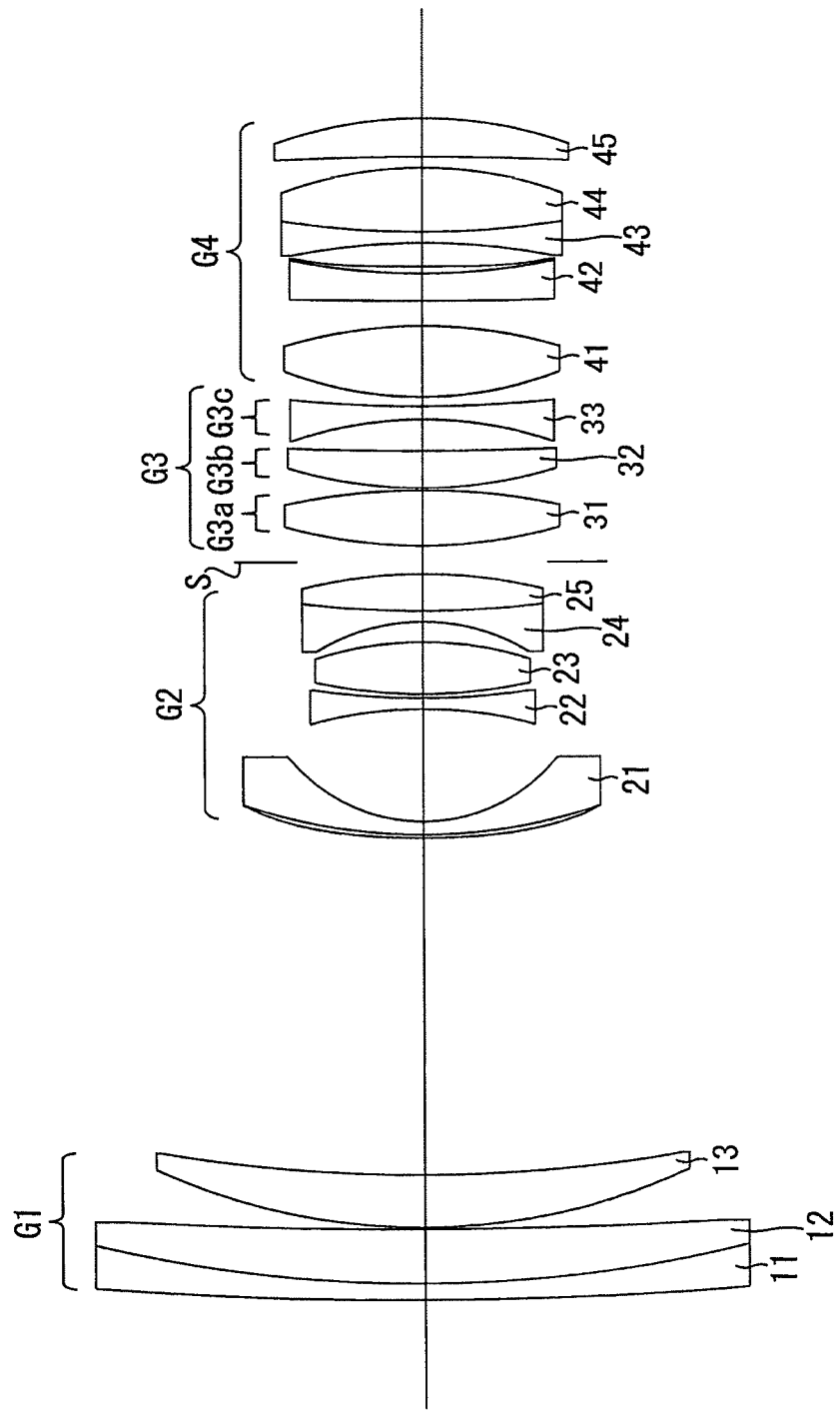
FIG. 6 shows a lens arrangement of the second numerical embodiment of a zoom lens system, according to the present invention, when focused on an object at infinity at the long focal length extremity.

FIGS. 5 through 8D and Tables 5 through 8 disclose a second numerical embodiment of the zoom lens system according to the present invention. FIG. 5 shows a lens arrangement of the second numerical embodiment of the zoom lens system when focused on an object at infinity at the short focal length extremity. FIGS. 7A, 7B, 7C and 7D show various aberrations that occurred in the zoom lens system of FIG. 5. FIG. 6 shows a lens arrangement of the second numerical embodiment of the zoom lens system when focused on an object at infinity at the long focal length extremity. FIGS. 8A, 8B, 8C and 8D show various aberrations that occurred in the zoom lens system of FIG. 6. Table 5 indicates the surface data, Table 6 indicates various lens system data, Table 7 indicates aspherical surface data, and Table 8 indicates lens-group data.

The lens arrangement of the zoom lens system of the second numerical embodiment is the same as that of the first numerical embodiment, except for the following features:

(1) An aspherical surface is formed on the image side of the single biconvex positive lens element 31 of the first sub-lens group G3a.

(2) The positive lens element 45 of the fourth lens group G4 is a positive meniscus lens element having a convex surface on the image side.

TABLE 5

SURFACE DATA

| Surf. No. | R | d | N(d) | ν(d) |
|---|---|---|---|---|
| 1 | 397.019 | 1.500 | 1.84666 | 23.8 |
| 2 | 128.846 | 4.968 | 1.77250 | 49.6 |
| 3 | 507.063 | 0.150 | | |
| 4 | 59.609 | 4.803 | 1.77250 | 49.6 |
| 5 | 144.268 | d5 | | |
| 6* | 78.896 | 0.300 | 1.52972 | 42.7 |
| 7 | 51.774 | 1.200 | 1.88300 | 40.8 |
| 8 | 15.984 | 10.316 | | |
| 9 | −39.108 | 1.000 | 1.88300 | 40.8 |
| 10 | 71.025 | 0.373 | | |
| 11 | 47.578 | 4.770 | 1.65412 | 39.7 |
| 12 | −31.603 | 1.857 | | |
| 13 | −18.783 | 1.000 | 1.72916 | 54.7 |
| 14 | 99.397 | 3.391 | 1.84666 | 23.8 |
| 15 | −45.536 | d15 | | |
| 16 Diaphragm | ∞ | 1.500 | | |
| 17 | 47.744 | 5.072 | 1.77250 | 49.5 |
| 18* | −61.457 | 0.200 | | |
| 19 | 43.491 | 3.391 | 1.49700 | 81.6 |
| 20 | 342.454 | 2.880 | | |
| 21 | −37.052 | 1.200 | 1.88300 | 40.8 |
| 22 | 128.616 | d22 | | |
| 23 | 35.383 | 6.519 | 1.49700 | 81.6 |
| 24 | −44.178 | 2.299 | | |
| 25 | 508.586 | 2.500 | 1.84666 | 23.8 |
| 26 | 62.757 | 0.641 | 1.52972 | 42.7 |
| 27* | 510.000 | 2.176 | | |
| 28 | −61.318 | 1.000 | 1.90366 | 31.3 |
| 29 | 86.905 | 5.900 | 1.49700 | 81.6 |
| 30 | −36.674 | 1.000 | | |
| 31 | −264.023 | 3.537 | 1.74400 | 44.8 |
| 32 | −40.029 | — | | |

The asterisk (*) designates an aspherical surface which is rotationally symmetrical with respect to the optical axis.

TABLE 6

ZOOM LENS SYSTEM DATA
Zoom Ratio: 2.94

| | Short Focal Length Extremity | Intermediate Focal Length | Long Focal Length Extremity |
|---|---|---|---|
| FNO. | 2.9 | 2.9 | 2.9 |
| f | 16.52 | 28.36 | 48.50 |
| W | 41.9 | 26.8 | 16.3 |
| Y | 14.24 | 14.24 | 14.24 |
| fB | 37.50 | 51.11 | 68.26 |
| L | 144.12 | 154.44 | 176.56 |
| d5 | 2.861 | 16.280 | 30.920 |
| d15 | 20.951 | 8.529 | 1.100 |
| d22 | 7.370 | 3.084 | 0.840 |

TABLE 7

ASPHERICAL SURFACE DATA

| Surf. No. | K | A4 | A6 | A8 |
|---|---|---|---|---|
| 6 | 0.000 | 0.1904E−04 | −0.3615E−07 | 0.1881E−09 |
| 18 | 0.000 | −0.1221E−05 | 0.1415E−08 | −0.1562E−10 |
| 27 | 0.000 | 0.2695E−04 | 0.2487E−08 | 0.6510E−10 |

| Surf. No. | A10 | A12 |
|---|---|---|
| 6 | −0.5309E−12 | 0.9167E−15 |
| 18 | 0.5307E−13 | 0.0000E+00 |
| 27 | −0.1108E−12 | 0.0000E+00 |

TABLE 8

LENS GROUP DATA

| Lens Group | 1st Surf. | Focal Length |
|---|---|---|
| 1 | 1 | 128.38 |
| 2 | 6 | −15.50 |
| 3 | 17 | 67.62 |
| 4 | 23 | 36.71 |

Numerical Embodiment 3

Figure 10:
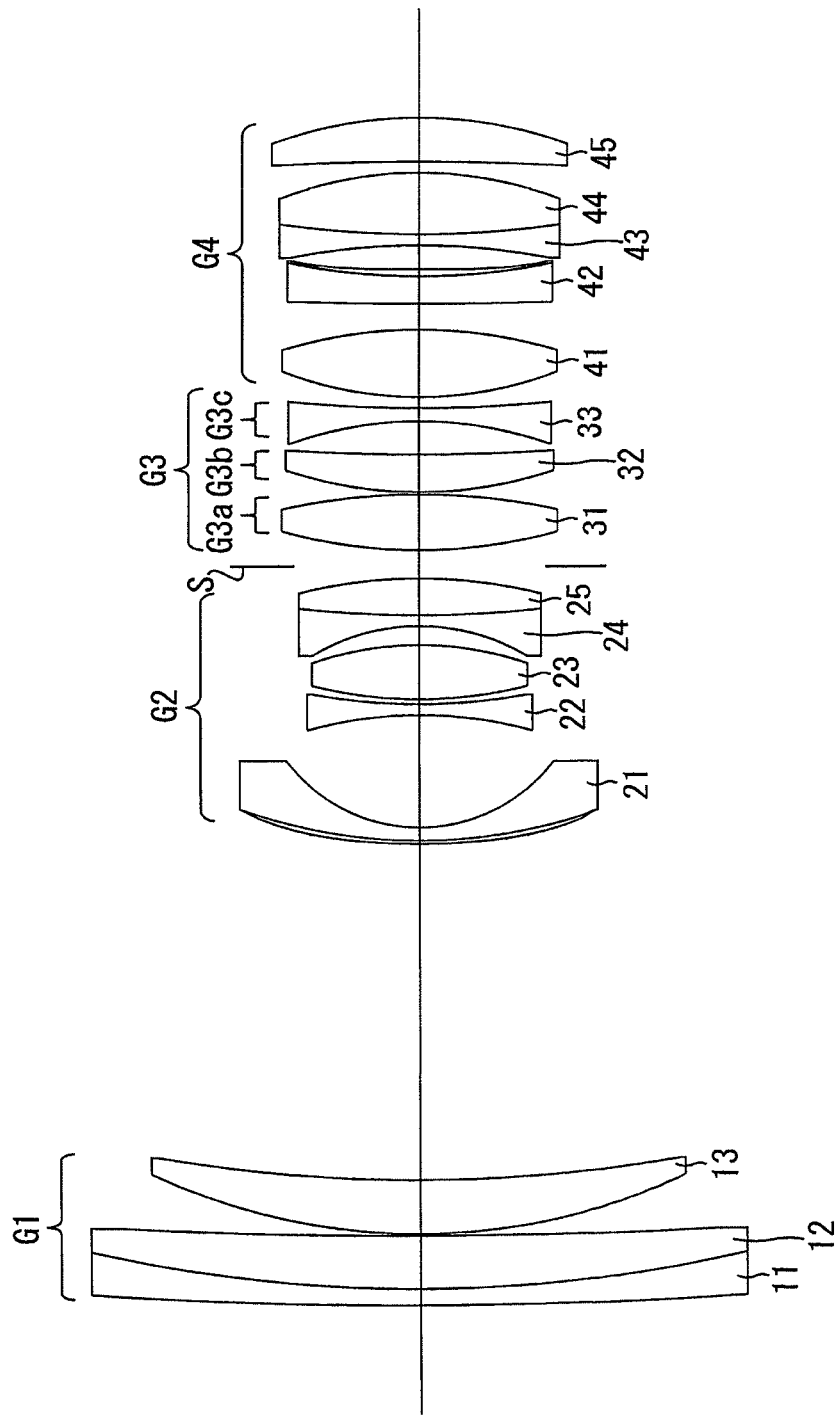
FIG. 10 shows a lens arrangement of the third numerical embodiment of a zoom lens system, according to the present invention, when focused on an object at infinity at the long focal length extremity.

FIGS. 9 through 12D and Tables 9 through 12 disclose a third numerical embodiment of the zoom lens system according to the present invention. FIG. 9 shows a lens arrangement of the third numerical embodiment of the zoom lens system when focused on an object at infinity at the short focal length extremity. FIGS. 11A, 11B, 11C and 11D show various aberrations that occurred in the zoom lens system of FIG. 9. FIG. 10 shows a lens arrangement of the third numerical embodiment of the zoom lens system when focused on an object at infinity at the long focal length extremity. FIGS. 12A, 12B, 12C and 12D show various aberrations that occurred in the zoom lens system of FIG. 10. Table 9 indicates the surface data, Table 10 indicates various lens system data, Table 11 indicates aspherical surface data, and Table 12 indicates lens-group data.

The lens arrangement of the zoom lens system of the third numerical embodiment is the same as that of the second numerical embodiment.

TABLE 9

SURFACE DATA

| Surf. No. | R | d | N(d) | ν(d) |
|---|---|---|---|---|
| 1 | 469.978 | 1.500 | 1.84666 | 23.8 |
| 2 | 136.287 | 4.851 | 1.77250 | 49.6 |
| 3 | 552.997 | 0.150 | | |
| 4 | 58.140 | 4.925 | 1.77250 | 49.6 |
| 5 | 142.356 | d5 | | |
| 6* | 72.163 | 0.300 | 1.52972 | 42.7 |
| 7 | 49.575 | 1.200 | 1.88300 | 40.8 |
| 8 | 15.563 | 10.308 | | |
| 9 | −38.848 | 1.000 | 1.88300 | 40.8 |
| 10 | 56.501 | 0.443 | | |
| 11 | 41.314 | 4.976 | 1.65412 | 39.7 |
| 12 | −30.538 | 1.744 | | |
| 13 | −19.380 | 1.000 | 1.72916 | 54.7 |
| 14 | 107.304 | 3.355 | 1.84666 | 23.8 |
| 15 | −46.273 | d15 | | |
| 16 Diaphragm | ∞ | 1.500 | | |
| 17 | 48.315 | 5.115 | 1.77250 | 49.5 |
| 18* | −61.012 | 0.200 | | |
| 19 | 39.222 | 3.462 | 1.49700 | 81.6 |
| 20 | 207.889 | 3.036 | | |
| 21 | −35.637 | 1.200 | 1.88300 | 40.8 |
| 22 | 125.679 | d22 | | |
| 23 | 35.766 | 6.148 | 1.49700 | 81.6 |
| 24 | −44.245 | 2.376 | | |
| 25 | 470.224 | 2.500 | 1.84666 | 23.8 |
| 26 | 60.545 | 0.646 | 1.52972 | 42.7 |
| 27* | 418.598 | 2.219 | | |
| 28 | −61.881 | 1.000 | 1.90366 | 31.3 |
| 29 | 93.037 | 5.645 | 1.49700 | 81.6 |
| 30 | −36.009 | 1.000 | | |
| 31 | −253.333 | 4.035 | 1.74400 | 44.8 |
| 32 | −39.917 | — | | |

The asterisk (*) designates an aspherical surface which is rotationally symmetrical with respect to the optical axis.

TABLE 10

ZOOM LENS SYSTEM DATA
Zoom Ratio: 2.94

| | Short Focal Length Extremity | Intermediate Focal Length | Long Focal Length Extremity |
|---|---|---|---|
| FNO. | 2.9 | 2.9 | 2.9 |
| f | 16.48 | 28.36 | 48.50 |
| W | 42.7 | 27.5 | 16.9 |
| Y | 14.63 | 14.69 | 14.80 |
| fB | 37.50 | 51.22 | 68.31 |
| L | 145.08 | 155.04 | 177.03 |
| d5 | 2.896 | 16.148 | 30.786 |
| d15 | 21.483 | 8.696 | 1.100 |
| d22 | 7.370 | 3.137 | 1.000 |

TABLE 11

ASPHERICAL SURFACE DATA

| Surf. No. | K | A4 | A6 | A8 |
|---|---|---|---|---|
| 6 | 0.000 | 0.1828E−04 | −0.3513E−07 | 0.1761E−09 |
| 18 | 0.000 | −0.1952E−05 | 0.1246E−09 | −0.1088E−10 |
| 27 | 0.000 | 0.2729E−04 | 0.3857E−08 | 0.5713E−10 |

| Surf. No. | A10 | A12 |
|---|---|---|
| 6 | −0.4909E−12 | 0.8381E−15 |
| 18 | 0.5016E−13 | 0.0000E+00 |
| 27 | −0.1286E−12 | 0.0000E+00 |

TABLE 12

LENS GROUP DATA

| Lens Group | 1st Surf. | Focal Length |
|---|---|---|
| 1 | 1 | 126.78 |
| 2 | 6 | −15.60 |
| 3 | 17 | 68.55 |
| 4 | 23 | 36.56 |

Numerical Embodiment 4

Figure 13:
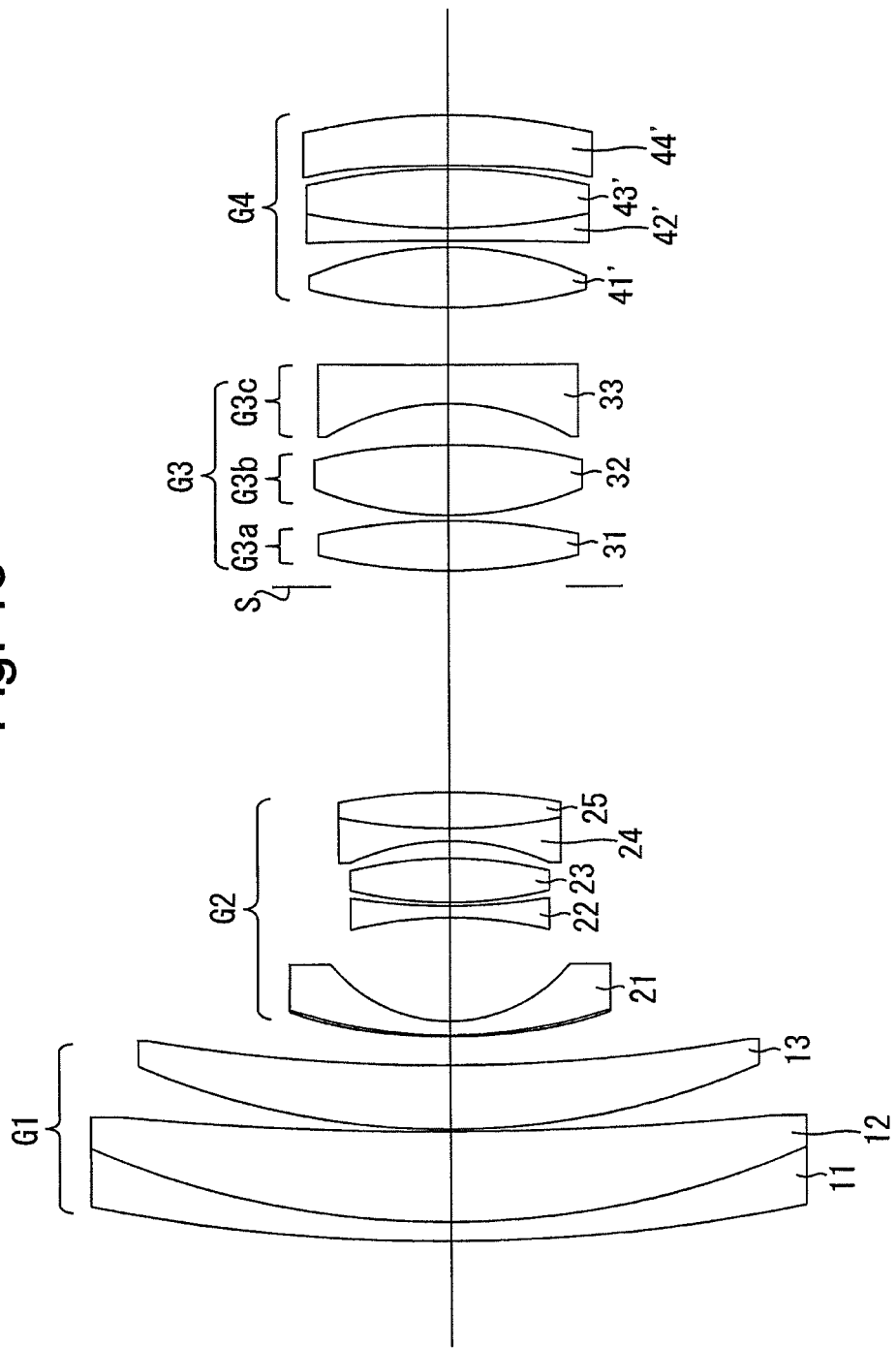
FIG. 13 shows a lens arrangement of a fourth numerical embodiment of a zoom lens system, according to the present invention, when focused on an object at infinity at the short focal length extremity.
Figure 14:
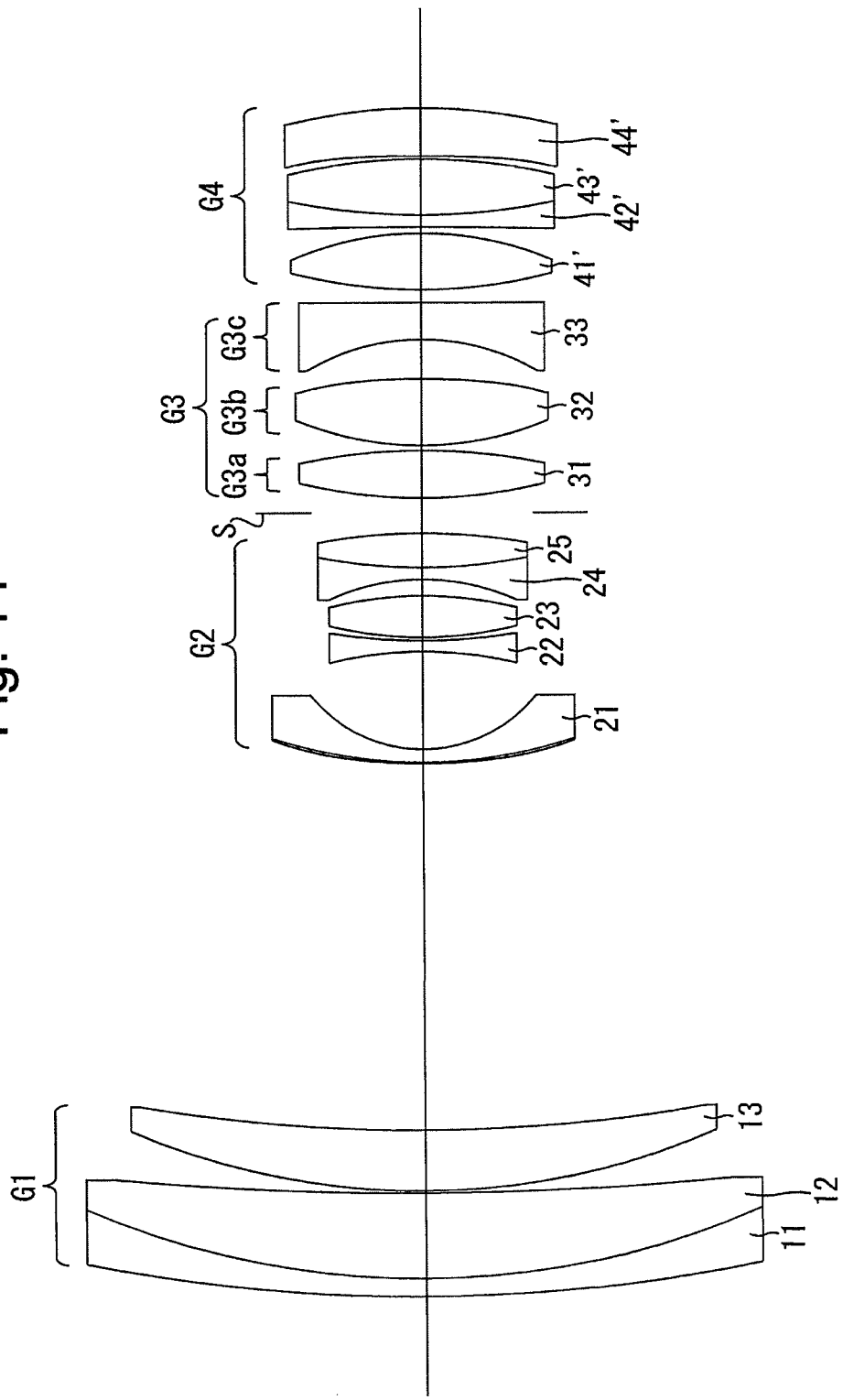
FIG. 14 shows a lens arrangement of the fourth numerical embodiment of a zoom lens system, according to the present invention, when focused on an object at infinity at the long focal length extremity.
Figure 15A:
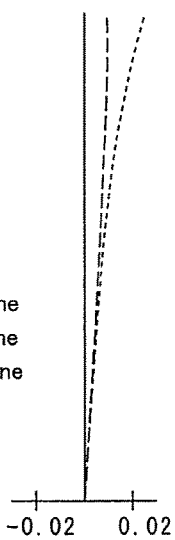
FIGS. 15A, 15B, 15C and 15D show various aberrations that occurred in the zoom lens system of FIG. 13.
Figure 15B:
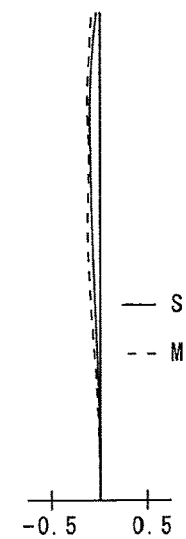
Figure 15C:
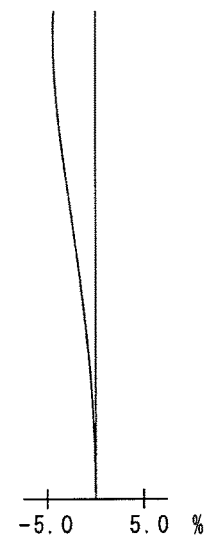
Figure 15D:
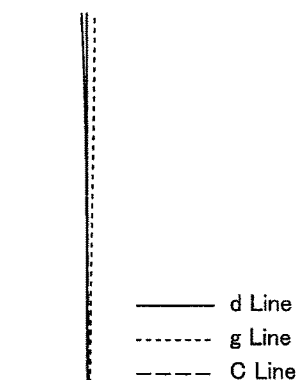
Figure 16A:
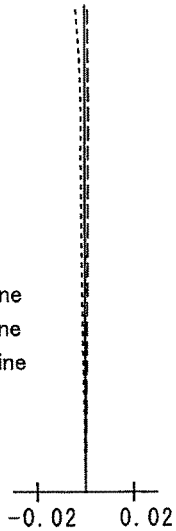
FIGS. 16A, 16B, 16C and 16D show various aberrations that occurred in the zoom lens system of FIG. 14.
Figure 16B:
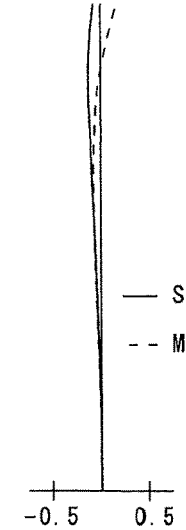
Figure 16C:
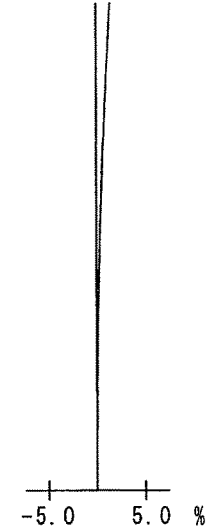
Figure 16D:
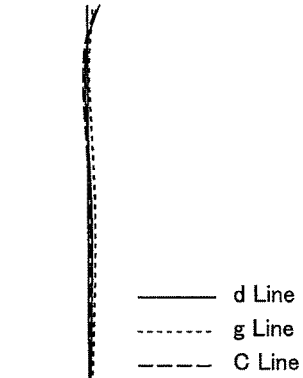

FIGS. 13 through 16D and Tables 13 through 16 disclose a fourth numerical embodiment of the zoom lens system according to the present invention. FIG. 13 shows a lens arrangement of the fourth numerical embodiment of the zoom lens system when focused on an object at infinity at the short focal length extremity. FIGS. 15A, 15B, 15C and 15D show various aberrations that occurred in the zoom lens system of FIG. 13. FIG. 14 shows a lens arrangement of the fourth numerical embodiment of the zoom lens system when focused on an object at infinity at the long focal length extremity. FIGS. 16A, 16B, 16C and 16D show various aberrations that occurred in the zoom lens system of FIG. 14. Table 13 indicates the surface data, Table 14 indicates various lens system data, Table 15 indicates aspherical surface data, and Table 16 indicates lens-group data.

The lens arrangement of the zoom lens system of the fourth numerical embodiment is the same as that of the first numerical embodiment, except for the following features:

(1) The single positive lens element 32 of the second sub-lens group G3b is a single biconvex positive lens element having an aspherical surface formed on the image side thereof.

(2) The fourth lens group G4 is configured of a biconvex positive lens element 41', a biconcave negative lens element 42', a biconvex positive lens element 43', and a positive meniscus lens element 44' having a convex surface on the image side, in that order from the object side. The biconcave negative lens element 42' and the biconvex positive lens element 43' are cemented to each other. Each side of the positive meniscus lens element 44' has an aspherical surface formed thereon.

TABLE 13

SURFACE DATA

| Surf. No. | R | d | N(d) | ν(d) |
|---|---|---|---|---|
| 1 | 172.901 | 1.800 | 1.84666 | 23.8 |
| 2 | 85.927 | 8.527 | 1.72916 | 54.7 |
| 3 | 332.762 | 0.200 | | |
| 4 | 75.122 | 6.053 | 1.77250 | 49.6 |
| 5 | 170.367 | d5 | | |
| 6* | 68.489 | 0.100 | 1.52972 | 42.7 |
| 7 | 49.432 | 1.300 | 1.88300 | 40.8 |
| 8 | 14.687 | 9.806 | | |
| 9 | −39.496 | 1.100 | 1.83481 | 42.7 |
| 10 | 58.716 | 0.330 | | |
| 11 | 39.070 | 4.170 | 1.67270 | 32.1 |
| 12 | −38.582 | 1.634 | | |
| 13 | −22.932 | 1.200 | 1.77250 | 49.6 |
| 14 | 55.154 | 3.419 | 1.84666 | 23.8 |
| 15 | −58.736 | d15 | | |
| 16 Diaphragm | ∞ | 1.500 | | |
| 17 | 52.861 | 4.724 | 1.49700 | 81.6 |
| 18 | −60.398 | 0.508 | | |
| 19 | 33.485 | 6.660 | 1.59522 | 67.7 |
| 20* | −71.481 | 3.921 | | |
| 21 | −23.030 | 3.674 | 1.88300 | 40.8 |
| 22 | 5345.252 | d22 | | |
| 23 | 52.622 | 5.675 | 1.49700 | 81.6 |
| 24 | −33.503 | 0.630 | | |
| 25 | −455.993 | 1.200 | 1.80518 | 25.4 |
| 26 | 67.707 | 5.581 | 1.49700 | 81.6 |
| 27 | −58.661 | 0.300 | | |
| 28* | −242.539 | 4.793 | 1.51633 | 64.1 |
| 29* | −55.470 | — | | |

The asterisk (*) designates an aspherical surface which is rotationally symmetrical with respect to the optical axis.

TABLE 14

ZOOM LENS SYSTEM DATA
Zoom Ratio: 2.95

| | Short Focal Length Extremity | Intermediate Focal Length | Long Focal Length Extremity |
|---|---|---|---|
| FNO. | 2.9 | 2.9 | 2.9 |
| f | 16.46 | 28.00 | 48.50 |
| W | 42.1 | 26.7 | 16.1 |
| Y | 14.24 | 14.24 | 14.24 |
| fB | 38.00 | 50.97 | 66.44 |
| L | 144.39 | 158.83 | 185.25 |
| d5 | 2.755 | 17.770 | 36.673 |
| d15 | 19.429 | 8.582 | 2.029 |
| d22 | 5.400 | 2.702 | 1.300 |

TABLE 15

ASPHERICAL SURFACE DATA

| Surf. No. | K | A4 | A6 | A8 |
|---|---|---|---|---|
| 6 | 0.000 | 0.1586E−04 | −0.3377E−07 | 0.6561E−10 |
| 20 | 0.000 | −0.8292E−05 | −0.2695E−07 | −0.1339E−10 |
| 28 | 0.000 | −0.2017E−04 | −0.3002E−07 | 0.1093E−09 |
| 29 | 0.000 | −0.5698E−06 | −0.1094E−07 | 0.1275E−09 |

| Surf. No. | A10 | A12 |
|---|---|---|
| 6 | −0.3584E−13 | 0.0000E+00 |
| 20 | 0.0000E+00 | 0.0000E+00 |
| 28 | 0.0000E+00 | 0.0000E+00 |
| 29 | 0.0000E+00 | 0.0000E+00 |

TABLE 16

LENS GROUP DATA

| Lens Group | 1$^{st}$ Surf. | Focal Length |
|---|---|---|
| 1 | 1 | 139.08 |
| 2 | 6 | −14.67 |
| 3 | 17 | 62.33 |
| 4 | 23 | 32.61 |

Numerical Embodiment 5

Figure 17:
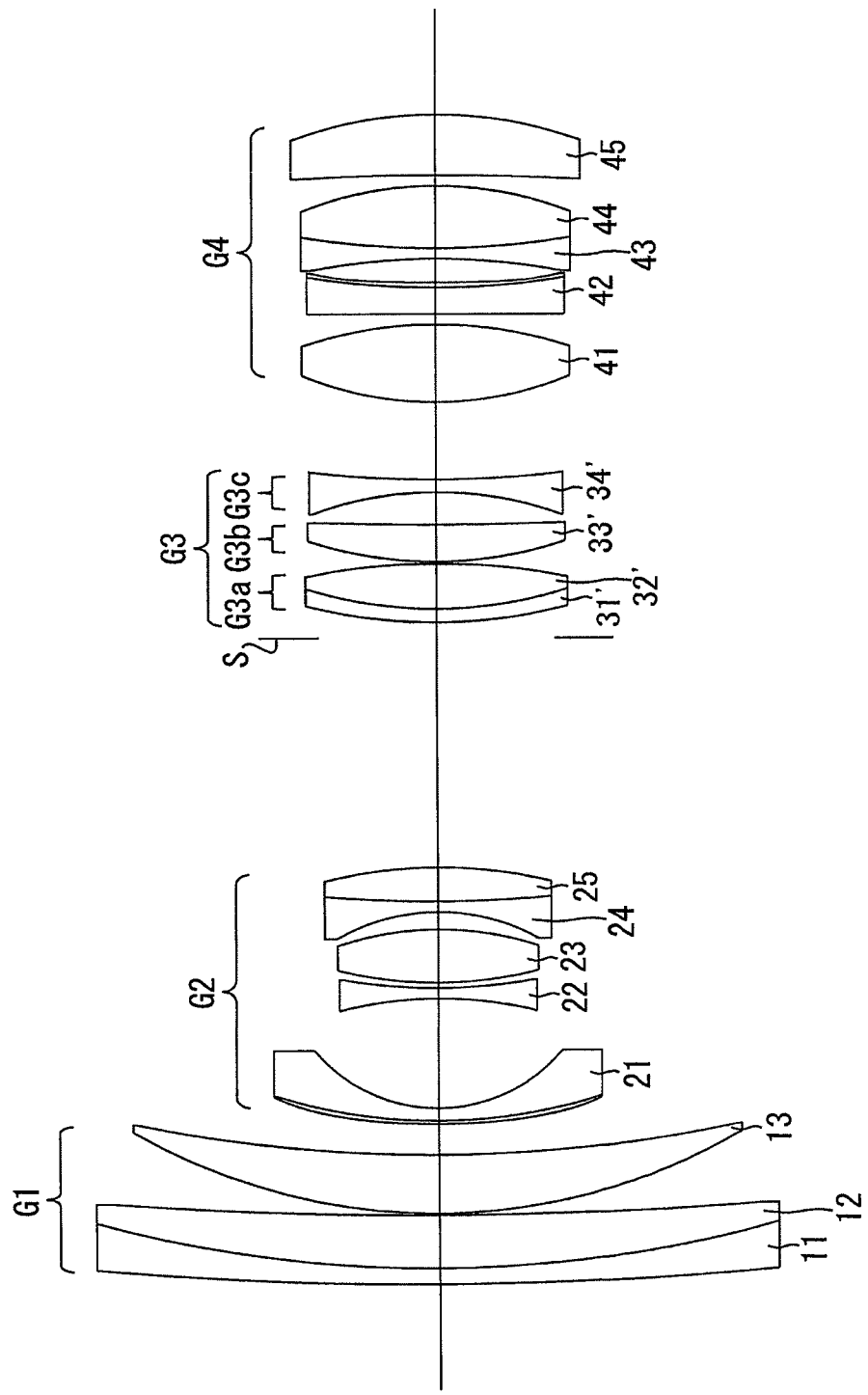
FIG. 17 shows a lens arrangement of a fifth numerical embodiment of a zoom lens system, according to the present invention, when focused on an object at infinity at the short focal length extremity.
Figure 18:
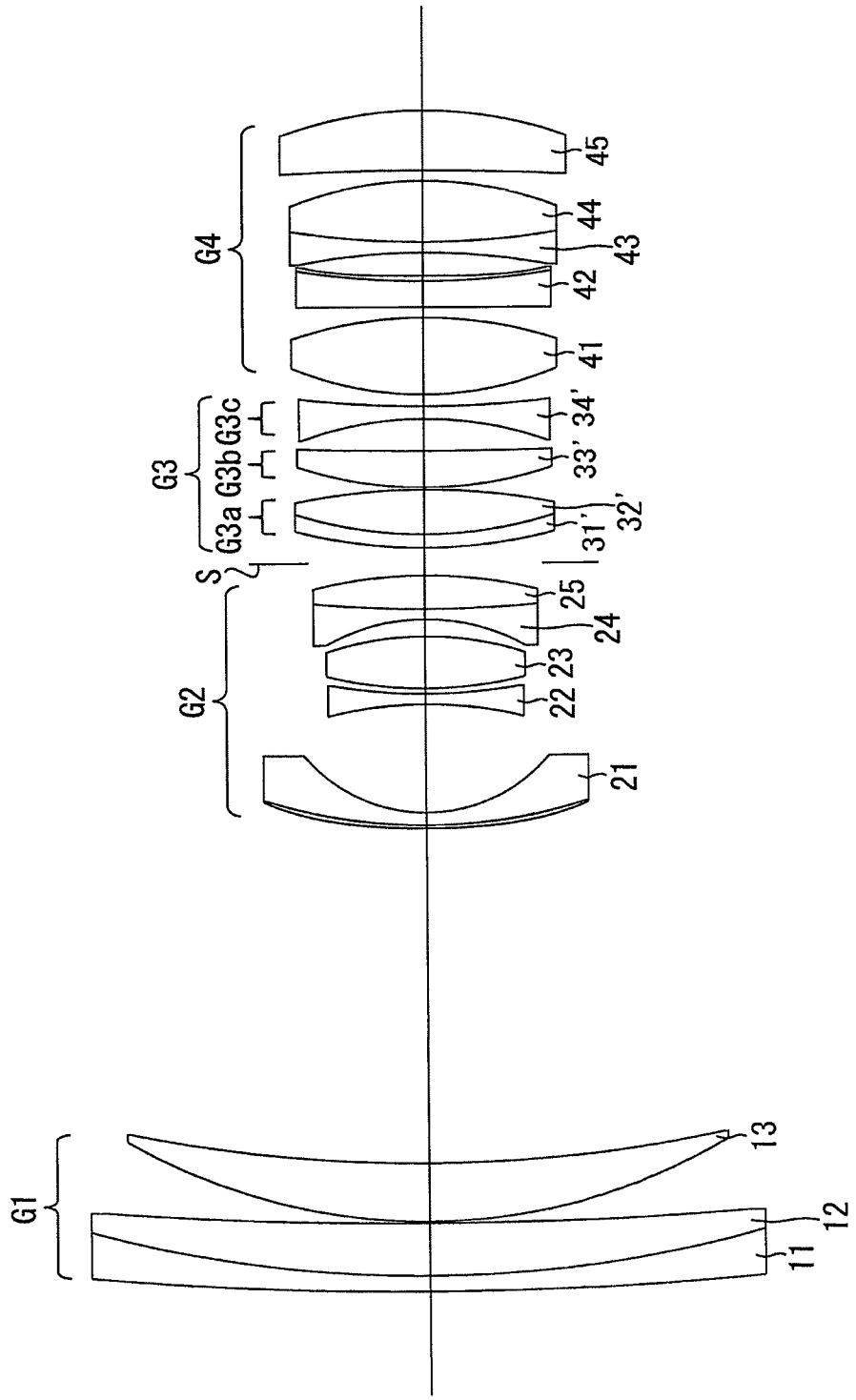
FIG. 18 shows a lens arrangement of the fifth numerical embodiment of a zoom lens system, according to the present invention, when focused on an object at infinity at the long focal length extremity.
Figure 19A:
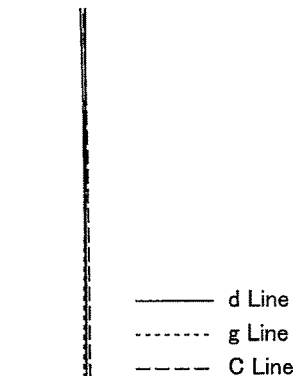
FIGS. 19A, 19B, 19C and 19D show various aberrations that occurred in the zoom lens system of FIG. 17.
Figure 19B:
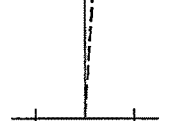
Figure 19C:
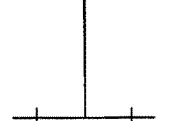
Figure 19D:
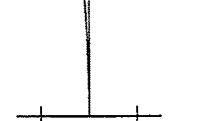
Figure 20A:
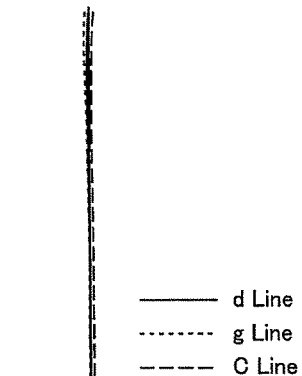
FIGS. 20A, 20B, 20C and 20D show various aberrations that occurred in the zoom lens system of FIG. 18.
Figure 20B:
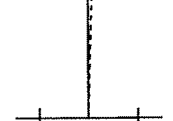
Figure 20C:
Figure 20D:
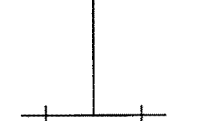

FIGS. 17 through 20D and Tables 17 through 20 disclose a fifth numerical embodiment of the zoom lens system according to the present invention. FIG. 17 shows a lens arrangement of the fifth numerical embodiment of the zoom lens system when focused on an object at infinity at the short focal length extremity. FIGS. 19A, 19B, 19C and 19D show various aberrations that occurred in the zoom lens system of FIG. 17. FIG. 18 shows a lens arrangement of the fifth numerical embodiment of the zoom lens system when focused on an object at infinity at the long focal length extremity. FIGS. 20A, 20B, 20C and 20D show various aberrations that occurred in the zoom lens system of FIG. 18. Table 17 indicates the surface data, Table 18 indicates various lens system data, Table 19 indicates aspherical surface data, and Table 20 indicates lens-group data.

The lens arrangement of the zoom lens system of the fifth numerical embodiment is the same as that of the first numerical embodiment, except for the following features:

(1) The first sub-lens group G3a is a cemented lens that is configured of a negative meniscus lens element 31', having a convex surface on the object side, which is cemented to a biconvex positive lens element 32', in that order from the object side. An aspherical surface is formed on the image side of the biconvex positive lens element 32'.

(2) The second sub-lens group G3b is configured of a single positive meniscus lens element 33' having a convex surface on the object side.

(3) The third sub-lens group G3c is configured of a single biconcave negative lens element 34'.

(4) In the fourth lens group G4, the negative lens element 42 is a biconcave negative lens element, and the positive lens element 45 is a positive meniscus lens element having a convex surface on the image side.

TABLE 17

SURFACE DATA

| Surf. No. | R | d | N(d) | ν(d) |
|---|---|---|---|---|
| 1 | 371.451 | 1.500 | 1.84666 | 23.8 |
| 2 | 124.307 | 5.041 | 1.77250 | 49.6 |
| 3 | 427.574 | 0.150 | | |
| 4 | 58.075 | 5.575 | 1.77250 | 49.6 |
| 5 | 143.096 | d5 | | |
| 6* | 77.634 | 0.300 | 1.52972 | 42.7 |
| 7 | 52.381 | 1.200 | 1.88300 | 40.8 |
| 8 | 15.605 | 10.400 | | |
| 9 | −39.419 | 1.000 | 1.88300 | 40.8 |
| 10 | 53.009 | 0.514 | | |
| 11 | 40.187 | 5.038 | 1.65412 | 39.7 |
| 12 | −30.468 | 1.658 | | |
| 13 | −19.612 | 1.000 | 1.72916 | 54.7 |
| 14 | 124.288 | 3.221 | 1.84666 | 23.8 |
| 15 | −45.338 | d15 | | |
| 16 Diaphragm | ∞ | 1.500 | | |
| 17 | 50.915 | 1.289 | 1.84666 | 23.8 |
| 18 | 42.429 | 4.275 | 1.83481 | 42.7 |
| 19* | −67.601 | 0.200 | | |
| 20 | 39.622 | 3.524 | 1.49700 | 81.6 |
| 21 | 423.705 | 3.069 | | |
| 22 | −35.056 | 1.200 | 1.88300 | 40.8 |
| 23 | 106.997 | d23 | | |
| 24 | 33.962 | 7.381 | 1.49700 | 81.6 |
| 25 | −41.041 | 1.000 | | |
| 26 | −4518.851 | 2.500 | 1.84666 | 23.8 |
| 27 | 78.977 | 0.500 | 1.52972 | 42.7 |
| 28* | 335.441 | 2.247 | | |
| 29 | −63.564 | 1.000 | 1.90366 | 31.3 |
| 30 | 81.792 | 5.900 | 1.49700 | 81.6 |
| 31 | −35.394 | 1.000 | | |
| 32 | −255.429 | 5.753 | 1.74400 | 44.8 |
| 33 | −40.624 | — | | |

The asterisk (*) designates an aspherical surface which is rotationally symmetrical with respect to the optical axis.

TABLE 18

ZOOM LENS SYSTEM DATA
Zoom Ratio: 2.94

| | Short Focal Length Extremity | Intermediate Focal Length | Long Focal Length Extremity |
|---|---|---|---|
| FNO. | 2.9 | 2.9 | 2.9 |
| f | 16.48 | 28.36 | 48.50 |
| W | 42.0 | 26.8 | 16.3 |
| Y | 14.24 | 14.24 | 14.24 |
| fB | 37.50 | 51.16 | 66.99 |
| L | 148.56 | 158.28 | 180.44 |
| d5 | 2.931 | 16.289 | 32.202 |
| d15 | 21.820 | 8.716 | 1.178 |
| d23 | 7.370 | 3.172 | 1.132 |

TABLE 19

ASPHERICAL SURFACE DATA

| Surf. No. | K | A4 | A6 | A8 |
|---|---|---|---|---|
| 6 | 0.000 | 0.1810E−04 | −0.3740E−07 | 0.1881E−09 |
| 19 | 0.000 | −0.2784E−05 | 0.9257E−10 | −0.1393E−10 |
| 28 | 0.000 | 0.2817E−04 | 0.5010E−08 | 0.5942E−10 |

| Surf. No. | A10 | A12 |
|---|---|---|
| 6 | −0.5421E−12 | 0.8606E−15 |
| 19 | 0.7134E−13 | 0.0000E+00 |
| 28 | −0.1443E−12 | 0.0000E+00 |

TABLE 20

LENS GROUP DATA

| Lens Group | 1$^{st}$ Surf. | Focal Length |
|---|---|---|
| 1 | 1 | 125.59 |
| 2 | 6 | −15.63 |
| 3 | 17 | 68.50 |
| 4 | 24 | 36.54 |

Numerical Embodiment 6

Figure 21:
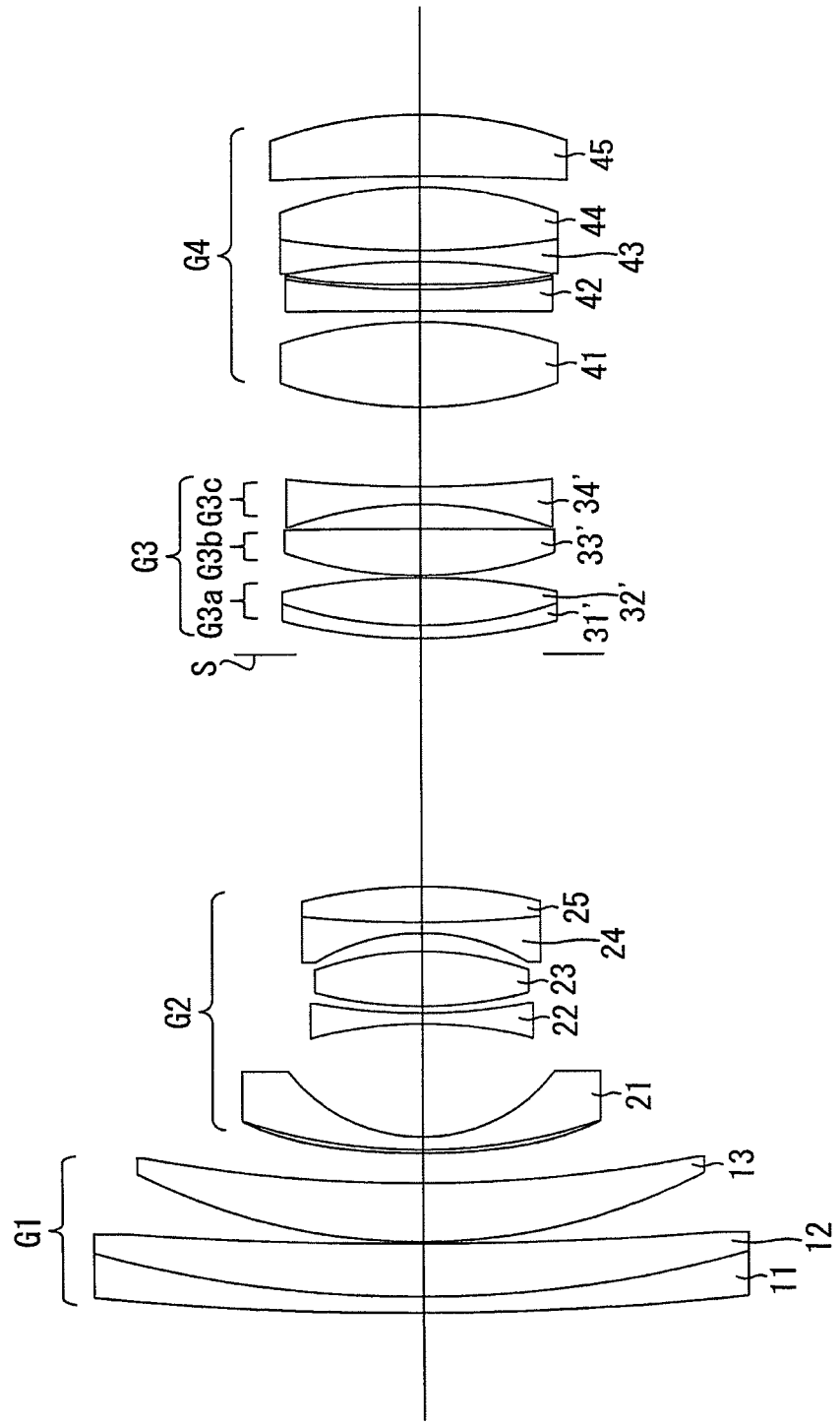
FIG. 21 shows a lens arrangement of a sixth numerical embodiment of a zoom lens system, according to the present invention, when focused on an object at infinity at the short focal length extremity.
Figure 22:
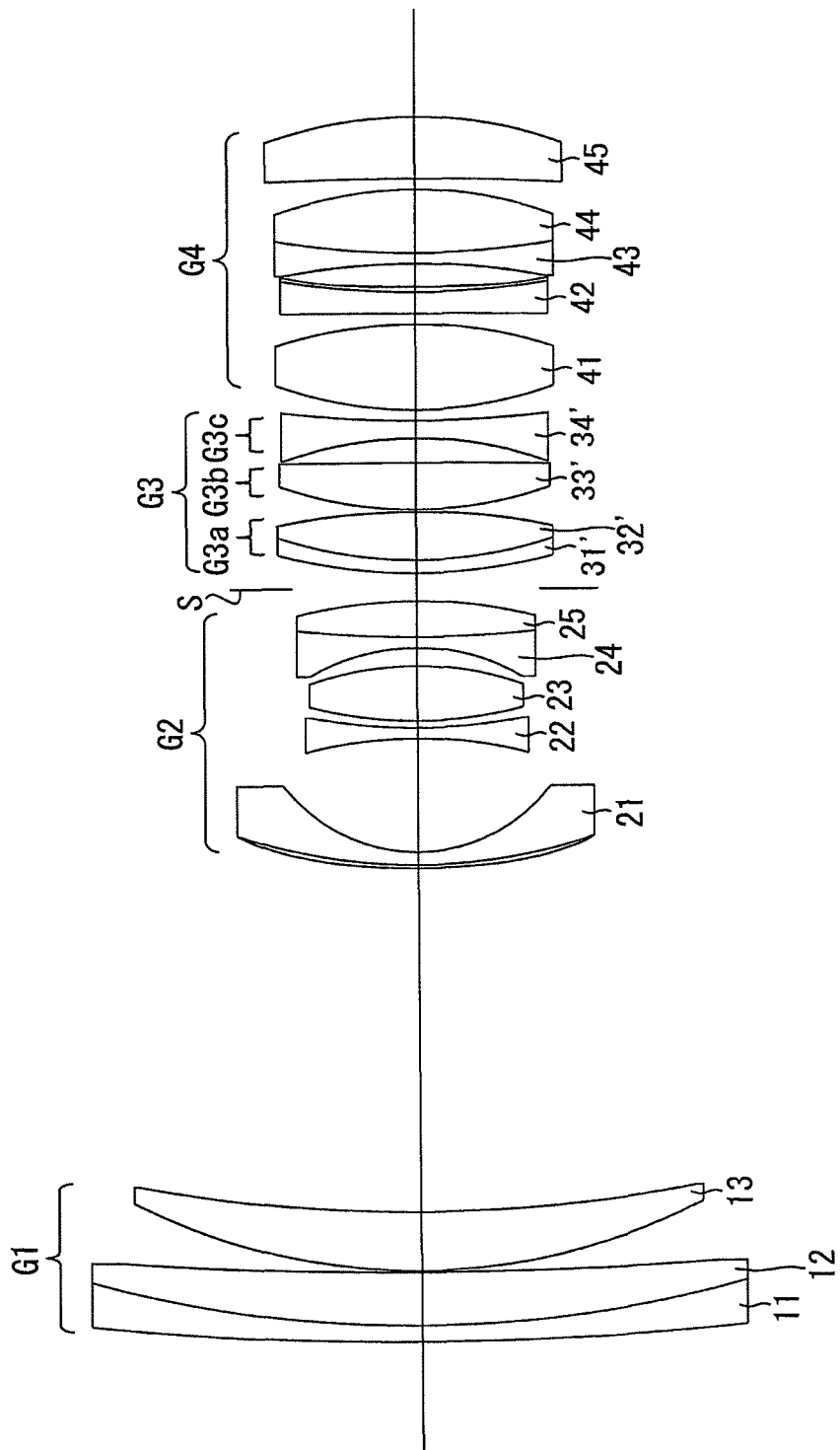
FIG. 22 shows a lens arrangement of the sixth numerical embodiment of a zoom lens system, according to the present invention, when focused on an object at infinity at the long focal length extremity.

FIGS. 21 through 24D and Tables 21 through 24 disclose a sixth numerical embodiment of the zoom lens system according to the present invention. FIG. 21 shows a lens arrangement of the sixth numerical embodiment of the zoom lens system when focused on an object at infinity at the short focal length extremity. FIGS. 23A, 23B, 23C and 23D show various aberrations that occurred in the zoom lens system of FIG. 21. FIG. 22 shows a lens arrangement of the sixth numerical embodiment of the zoom lens system when focused on an object at infinity at the long focal length extremity. FIGS. 24A, 24B, 24C and 24D show various aberrations that occurred in the zoom lens system of FIG. 22. Table 21 indicates the surface data, Table 22 indicates various lens system data, Table 23 indicates aspherical surface data, and Table 24 indicates lens-group data.

The lens arrangement of the zoom lens system of the sixth numerical embodiment is the same as that of the fifth numerical embodiment, except for the following feature:

(1) The single positive lens element 33' of the second sub-lens group G3b is configured of a single biconvex positive lens element.

TABLE 21

SURFACE DATA

| Surf. No. | R | d | N(d) | ν(d) |
|---|---|---|---|---|
| 1 | 309.418 | 1.500 | 1.84666 | 23.8 |
| 2 | 116.562 | 4.919 | 1.77250 | 49.6 |
| 3 | 399.631 | 0.150 | | |
| 4 | 58.904 | 5.440 | 1.77250 | 49.6 |
| 5 | 141.429 | d5 | | |
| 6* | 76.590 | 0.300 | 1.52972 | 42.7 |
| 7 | 52.848 | 1.200 | 1.88300 | 40.8 |
| 8 | 15.738 | 10.555 | | |
| 9 | −41.158 | 1.000 | 1.88300 | 40.8 |
| 10 | 54.083 | 0.647 | | |
| 11 | 39.975 | 5.107 | 1.59551 | 39.2 |
| 12 | −29.412 | 1.698 | | |
| 13 | −19.368 | 1.000 | 1.72916 | 54.7 |
| 14 | 112.517 | 3.324 | 1.84666 | 23.8 |

TABLE 21-continued

SURFACE DATA

| Surf. No. | R | d | N(d) | ν(d) |
|---|---|---|---|---|
| 15 | −45.494 | d15 | | |
| 16 Diaphragm | ∞ | 1.500 | | |
| 17 | 51.429 | 1.200 | 1.84666 | 23.8 |
| 18 | 41.143 | 4.467 | 1.83481 | 42.7 |
| 19* | −67.028 | 0.200 | | |
| 20 | 38.776 | 4.342 | 1.49700 | 81.6 |
| 21 | −837.668 | 2.285 | | |
| 22 | −35.794 | 1.637 | 1.88300 | 40.8 |
| 23 | 112.389 | d23 | | |
| 24 | 38.802 | 7.951 | 1.49700 | 81.6 |
| 25 | −41.732 | 1.000 | | |
| 26 | −1416.037 | 2.000 | 1.84666 | 23.8 |
| 27 | 80.556 | 0.500 | 1.52972 | 42.7 |
| 28* | 412.606 | 2.137 | | |
| 29 | −64.326 | 1.000 | 1.90366 | 31.3 |
| 30 | 80.112 | 5.900 | 1.49700 | 81.6 |
| 31 | −36.795 | 1.000 | | |
| 32 | −267.159 | 5.727 | 1.74400 | 44.8 |
| 33 | −40.714 | — | | |

The asterisk (*) designates an aspherical surface which is rotationally symmetrical with respect to the optical axis.

TABLE 22

ZOOM LENS SYSTEM DATA
Zoom Ratio: 2.94

| | Short Focal Length Extremity | Intermediate Focal Length | Long Focal Length Extremity |
|---|---|---|---|
| FNO. | 2.9 | 2.9 | 2.9 |
| f | 16.48 | 28.36 | 48.50 |
| W | 42.0 | 26.8 | 16.3 |
| Y | 14.24 | 14.24 | 14.24 |
| fB | 37.50 | 51.66 | 68.12 |
| L | 148.92 | 159.23 | 181.83 |
| d5 | 2.796 | 16.280 | 31.927 |
| d15 | 21.573 | 8.568 | 1.100 |
| d23 | 7.370 | 3.035 | 1.000 |

TABLE 23

ASPHERICAL SURFACE DATA

| Surf. No. | K | A4 | A6 | A8 |
|---|---|---|---|---|
| 6 | 0.000 | 0.1700E−04 | −0.3432E−07 | 0.1658E−09 |
| 19 | 0.000 | −0.2771E−05 | −0.1861E−08 | −0.4742E−11 |
| 28 | 0.000 | 0.2556E−04 | 0.5477E−08 | 0.2109E−10 |

| Surf. No. | A10 | A12 |
|---|---|---|
| 6 | −0.4525E−12 | 0.6761E−15 |
| 19 | 0.3439E−13 | 0.0000E+00 |
| 28 | −0.6647E−13 | 0.0000E+00 |

TABLE 24

LENS GROUP DATA

| Lens Group | 1st Surf. | Focal Length |
|---|---|---|
| 1 | 1 | 125.06 |
| 2 | 6 | −15.08 |
| 3 | 17 | 59.37 |
| 4 | 24 | 38.91 |

Numerical Embodiment 7

Figure 25:
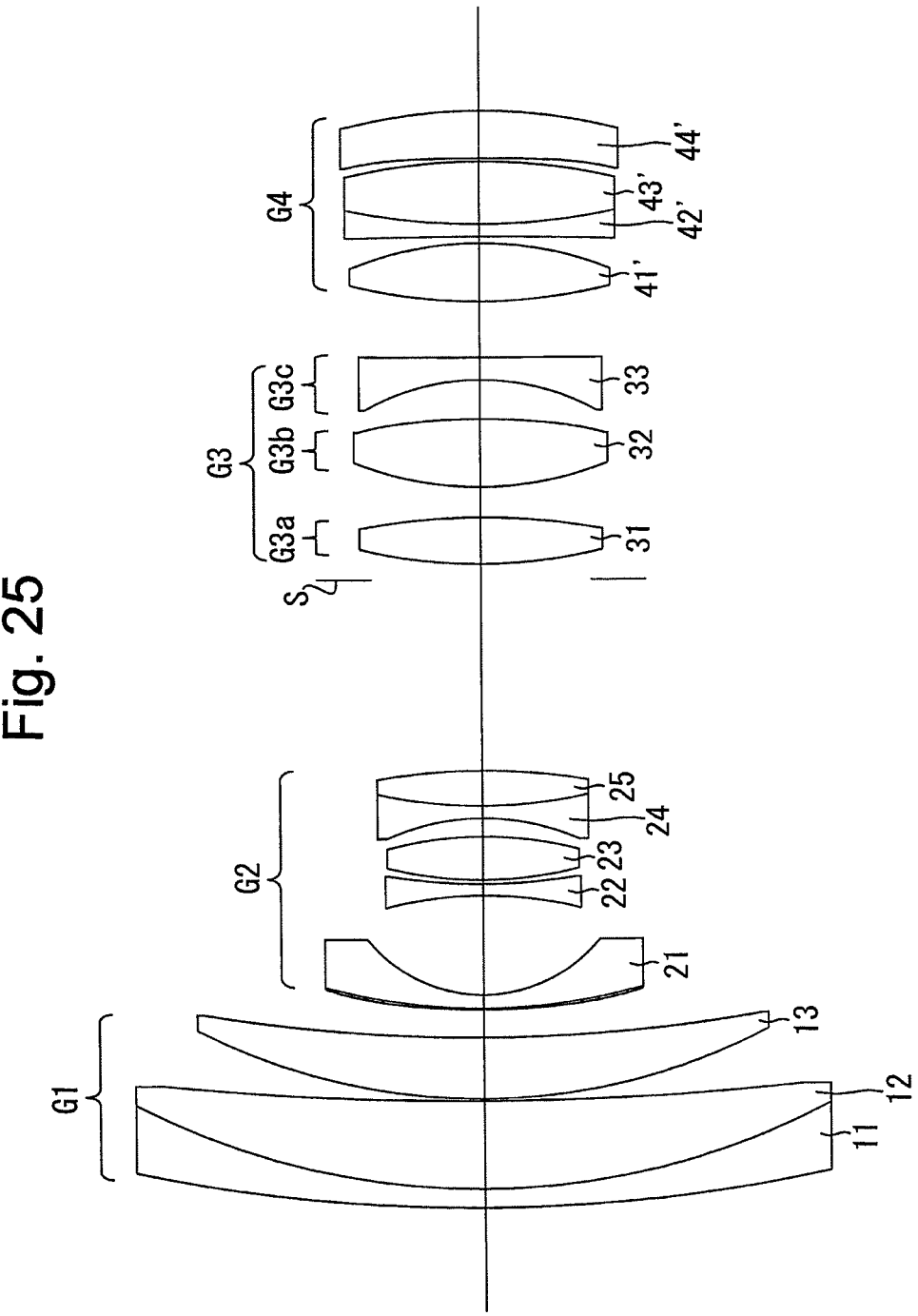
FIG. 25 shows a lens arrangement of a seventh numerical embodiment of a zoom lens system, according to the present invention, when focused on an object at infinity at the short focal length extremity.
Figure 26:
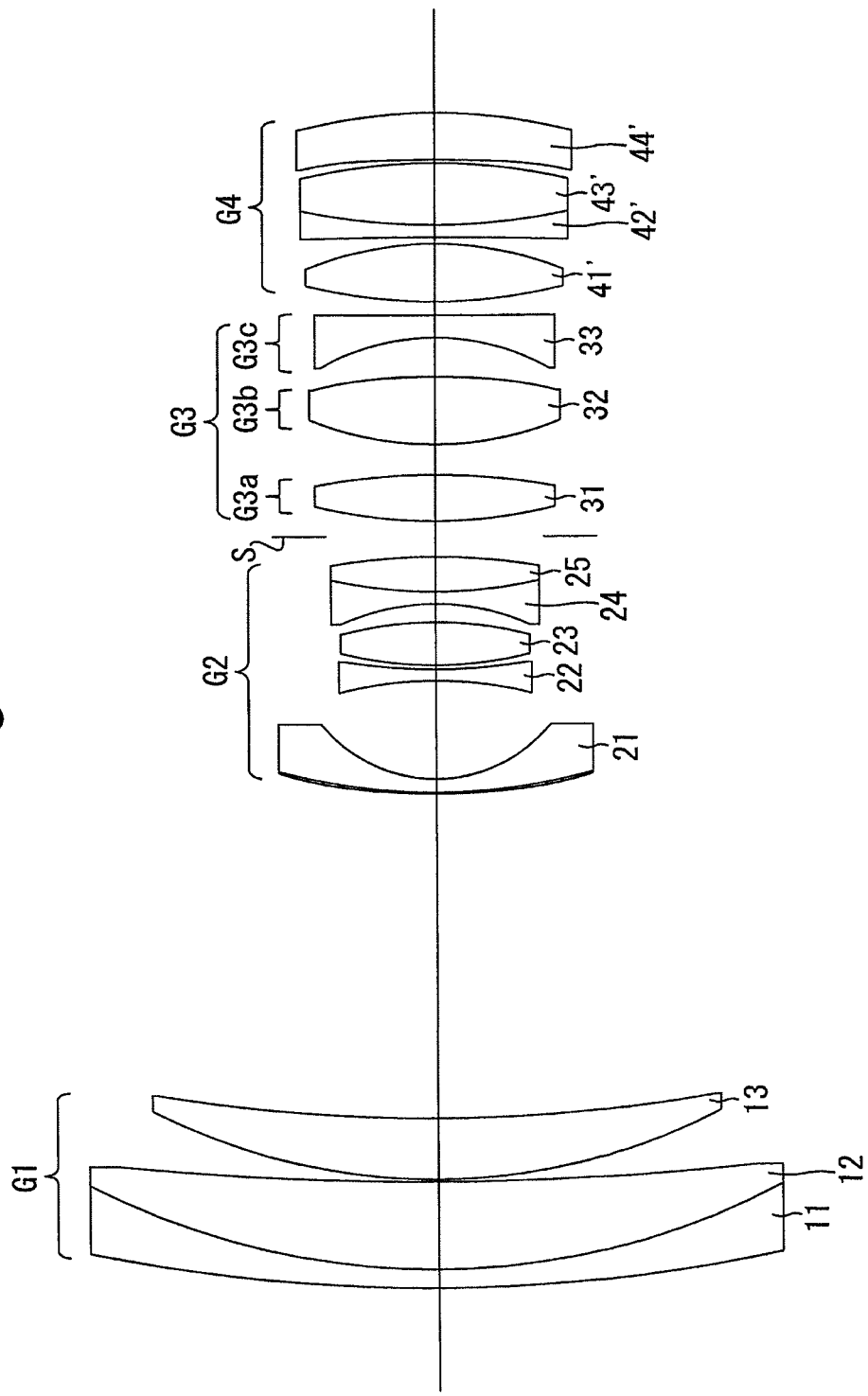
FIG. 26 shows a lens arrangement of the seventh numerical embodiment of a zoom lens system, according to the present invention, when focused on an object at infinity at the long focal length extremity.

FIGS. 25 through 28D and Tables 25 through 28 disclose a seventh numerical embodiment of the zoom lens system according to the present invention. FIG. 25 shows a lens arrangement of the seventh numerical embodiment of the zoom lens system when focused on an object at infinity at the short focal length extremity. FIGS. 27A, 27B, 27C and 27D show various aberrations that occurred in the zoom lens system of FIG. 25. FIG. 26 shows a lens arrangement of the seventh numerical embodiment of the zoom lens system when focused on an object at infinity at the long focal length extremity. FIGS. 28A, 28B, 28C and 28D show various aberrations that occurred in the zoom lens system of FIG. 26. Table 25 indicates the surface data, Table 26 indicates various lens system data, Table 27 indicates aspherical surface data, and Table 28 indicates lens-group data.

The lens arrangement of the zoom lens system of the seventh numerical embodiment is the same as that of the fourth numerical embodiment.

TABLE 25

SURFACE DATA

| Surf. No. | R | d | N(d) | ν(d) |
|---|---|---|---|---|
| 1 | 165.500 | 1.800 | 1.84666 | 23.8 |
| 2 | 73.519 | 8.462 | 1.72916 | 54.7 |
| 3 | 304.903 | 0.200 | | |
| 4 | 60.688 | 5.923 | 1.77250 | 49.6 |
| 5 | 161.892 | d5 | | |
| 6* | 86.058 | 0.100 | 1.52972 | 42.7 |
| 7 | 58.801 | 1.300 | 1.88300 | 40.8 |
| 8 | 14.570 | 9.529 | | |
| 9 | −38.221 | 1.100 | 1.83481 | 42.7 |
| 10 | 55.568 | 0.409 | | |
| 11 | 38.746 | 4.172 | 1.67270 | 32.1 |
| 12 | −36.033 | 1.772 | | |
| 13 | −22.626 | 1.200 | 1.77250 | 49.6 |
| 14 | 47.795 | 3.389 | 1.84666 | 23.8 |
| 15 | −59.998 | d15 | | |
| 16 Diaphragm | ∞ | 1.500 | | |
| 17 | 49.468 | 4.476 | 1.49700 | 81.6 |
| 18 | −64.113 | 2.929 | | |
| 19 | 33.222 | 6.545 | 1.59522 | 67.7 |
| 20* | −68.705 | 3.780 | | |
| 21 | −22.884 | 2.166 | 1.88300 | 40.8 |
| 22 | 2043.815 | d22 | | |
| 23 | 52.417 | 5.595 | 1.49700 | 81.6 |
| 24 | −33.690 | 0.630 | | |
| 25 | −465.995 | 1.200 | 1.80518 | 25.4 |
| 26 | 64.554 | 6.002 | 1.49700 | 81.6 |
| 27 | −56.912 | 0.300 | | |
| 28* | −280.996 | 4.563 | 1.51633 | 64.1 |
| 29* | −52.840 | — | | |

The asterisk (*) designates an aspherical surface which is rotationally symmetrical with respect to the optical axis.

TABLE 26

ZOOM LENS SYSTEM DATA
Zoom Ratio: 2.97

| | Short Focal Length Extremity | Intermediate Focal Length | Long Focal Length Extremity |
|---|---|---|---|
| FNO. | 2.9 | 2.9 | 2.9 |
| f | 16.46 | 28.00 | 48.83 |
| W | 42.0 | 26.7 | 16.0 |
| Y | 14.24 | 14.24 | 14.24 |
| fB | 38.00 | 50.33 | 63.79 |

TABLE 26-continued

ZOOM LENS SYSTEM DATA
Zoom Ratio: 2.97

|   | Short Focal Length Extremity | Intermediate Focal Length | Long Focal Length Extremity |
|---|---|---|---|
| L | 143.56 | 155.59 | 177.57 |
| d5 | 2.705 | 15.344 | 31.455 |
| d15 | 18.415 | 8.171 | 1.949 |
| d22 | 5.400 | 2.706 | 1.328 |

TABLE 27

ASPHERICAL SURFACE DATA

| Surf. No. | K | A4 | A6 | A8 |
|---|---|---|---|---|
| 6 | 0.000 | 0.1497E−04 | −0.2589E−07 | 0.2711E−10 |
| 20 | 0.000 | −0.7600E−05 | −0.2893E−07 | −0.1241E−10 |
| 28 | 0.000 | −0.2060E−04 | −0.2998E−07 | 0.9527E−10 |
| 29 | 0.000 | −0.1301E−05 | −0.1052E−07 | 0.1135E−09 |

| Surf. No. | A10 | A12 |
|---|---|---|
| 6 | 0.6306E−14 | 0.0000E+00 |
| 20 | −0.2149E−13 | 0.0000E+00 |
| 28 | 0.0000E+00 | 0.0000E+00 |
| 29 | 0.0000E+00 | 0.0000E+00 |

TABLE 28

LENS GROUP DATA

| Lens Group | 1st Surf. | Focal Length |
|---|---|---|
| 1 | 1 | 108.90 |
| 2 | 6 | −13.76 |
| 3 | 17 | 60.98 |
| 4 | 23 | 31.99 |

Numerical Embodiment 8

Figure 29:
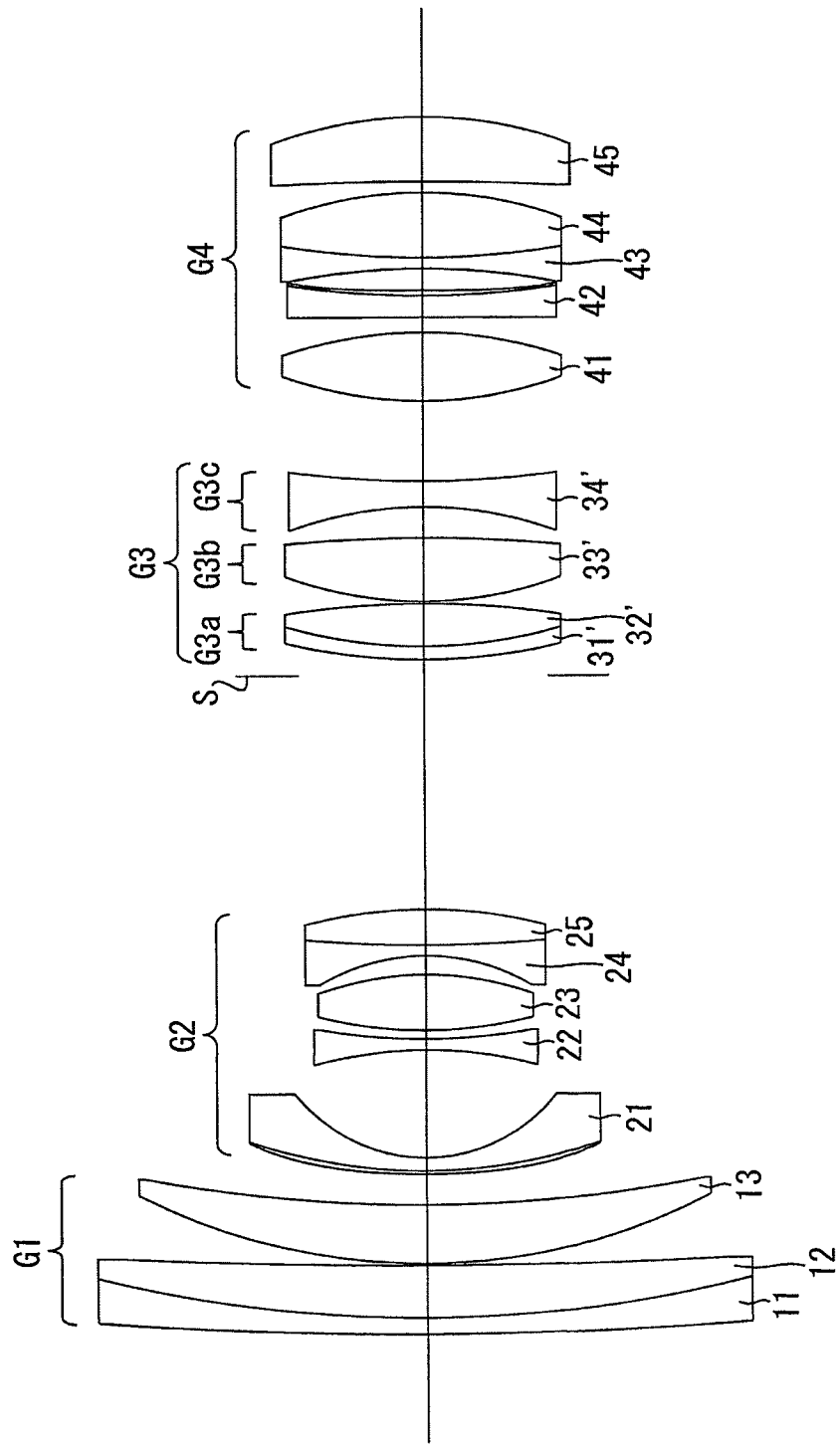
FIG. 29 shows a lens arrangement of a eighth numerical embodiment of a zoom lens system, according to the present invention, when focused on an object at infinity at the short focal length extremity.
Figure 30:
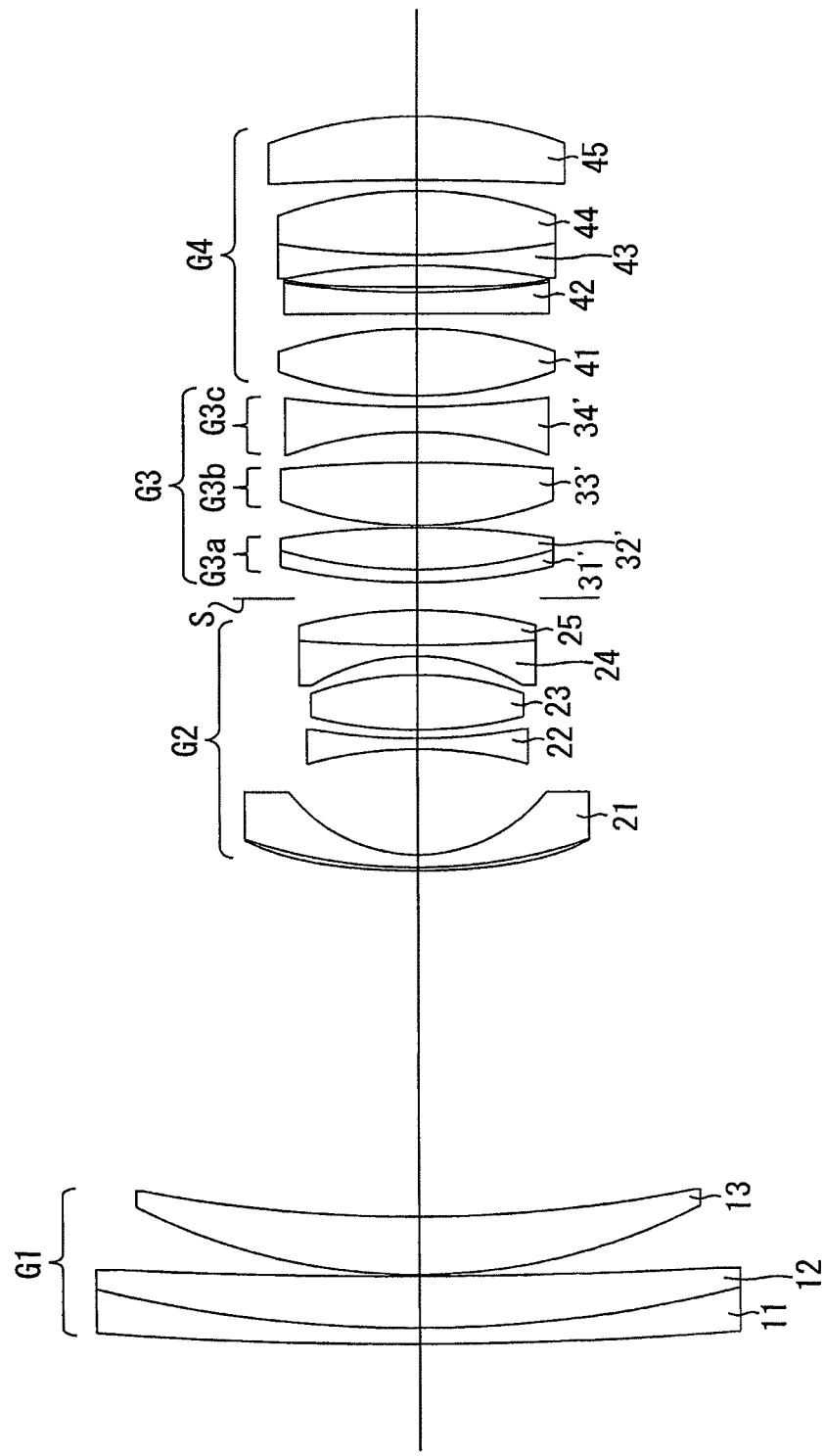
FIG. 30 shows a lens arrangement of the eighth numerical embodiment of a zoom lens system, according to the present invention, when focused on an object at infinity at the long focal length extremity.

FIGS. 29 through 32D and Tables 29 through 32 disclose an eighth numerical embodiment of the zoom lens system according to the present invention. FIG. 29 shows a lens arrangement of the eighth numerical embodiment of the zoom lens system when focused on an object at infinity at the short focal length extremity. FIGS. 31A, 31B, 31C and 31D show various aberrations that occurred in the zoom lens system of FIG. 29. FIG. 30 shows a lens arrangement of the eighth numerical embodiment of the zoom lens system when focused on an object at infinity at the long focal length extremity. FIGS. 32A, 32B, 32C and 32D show various aberrations that occurred in the zoom lens system of FIG. 30. Table 29 indicates the surface data, Table 30 indicates various lens system data, Table 31 indicates aspherical surface data, and Table 32 indicates lens-group data.

The lens arrangement of the zoom lens system of the eighth numerical embodiment is the same as that of the sixth numerical embodiment.

TABLE 29

SURFACE DATA

| Surf. No. | R | d | N(d) | ν(d) |
|---|---|---|---|---|
| 1 | 406.592 | 1.500 | 1.84666 | 23.8 |
| 2 | 125.600 | 4.839 | 1.77250 | 49.6 |
| 3 | 577.584 | 0.150 | | |
| 4 | 58.397 | 5.426 | 1.77250 | 49.6 |
| 5 | 138.431 | d5 | | |
| 6* | 75.516 | 0.300 | 1.52972 | 42.7 |
| 7 | 50.739 | 1.200 | 1.88300 | 40.8 |
| 8 | 15.466 | 9.894 | | |
| 9 | −39.061 | 1.000 | 1.88300 | 40.8 |
| 10 | 57.538 | 0.794 | | |
| 11 | 41.030 | 5.144 | 1.59551 | 39.2 |
| 12 | −28.936 | 1.745 | | |
| 13 | −19.244 | 1.000 | 1.72916 | 54.7 |
| 14 | 138.052 | 3.298 | 1.84666 | 23.8 |
| 15 | −43.608 | d15 | | |
| 16 Diaphragm | ∞ | 1.500 | | |
| 17 | 56.072 | 1.200 | 1.84666 | 23.8 |
| 18 | 46.332 | 3.933 | 1.83481 | 42.7 |
| 19* | −89.117 | 0.200 | | |
| 20 | 36.853 | 5.882 | 1.49700 | 81.6 |
| 21 | −137.734 | 2.870 | | |
| 22 | −35.579 | 2.376 | 1.88300 | 40.8 |
| 23 | 94.485 | d23 | | |
| 24 | 38.073 | 6.298 | 1.49700 | 81.6 |
| 25 | −40.292 | 1.357 | | |
| 26 | −5283.593 | 2.000 | 1.84666 | 23.8 |
| 27 | 83.842 | 0.500 | 1.52972 | 42.7 |
| 28* | 2085.744 | 1.997 | | |
| 29 | −63.997 | 1.000 | 1.90366 | 31.3 |
| 30 | 80.442 | 6.004 | 1.49700 | 81.6 |
| 31 | −37.536 | 1.000 | | |
| 32 | −262.987 | 5.983 | 1.72000 | 43.7 |
| 33 | −39.548 | — | | |

The asterisk (*) designates an aspherical surface which is rotationally symmetrical with respect to the optical axis.

TABLE 30

ZOOM LENS SYSTEM DATA
Zoom Ratio: 2.94

|   | Short Focal Length Extremity | Intermediate Focal Length | Long Focal Length Extremity |
|---|---|---|---|
| FNO. | 2.9 | 2.9 | 2.9 |
| f | 16.48 | 28.36 | 48.50 |
| W | 42.0 | 26.8 | 16.3 |
| Y | 14.24 | 14.24 | 14.24 |
| fB | 37.50 | 51.63 | 68.05 |
| L | 149.57 | 160.12 | 182.91 |
| d5 | 2.828 | 16.504 | 32.371 |
| d15 | 21.488 | 8.564 | 1.105 |
| d23 | 7.370 | 3.033 | 1.000 |

TABLE 31

ASPHERICAL SURFACE DATA

| Surf. No. | K | A4 | A6 | A8 |
|---|---|---|---|---|
| 6 | 0.000 | 0.1800E−04 | −0.3412E−07 | 0.1565E−09 |
| 19 | 0.000 | −0.2340E−05 | −0.2348E−08 | −0.5884E−11 |
| 28 | 0.000 | 0.2559E−04 | 0.7103E−08 | 0.2085E−10 |

| Surf. No. | A10 | A12 |
|---|---|---|
| 6 | −0.4087E−12 | 0.6846E−15 |
| 19 | 0.3209E−13 | 0.0000E+00 |
| 28 | −0.5084E−13 | 0.0000E+00 |

TABLE 32

LENS GROUP DATA

| Lens Group | 1st Surf. | Focal Length |
|---|---|---|
| 1 | 1 | 125.09 |
| 2 | 6 | −15.26 |
| 3 | 17 | 62.13 |
| 4 | 24 | 36.80 |

Numerical Embodiment 9

Figure 33:
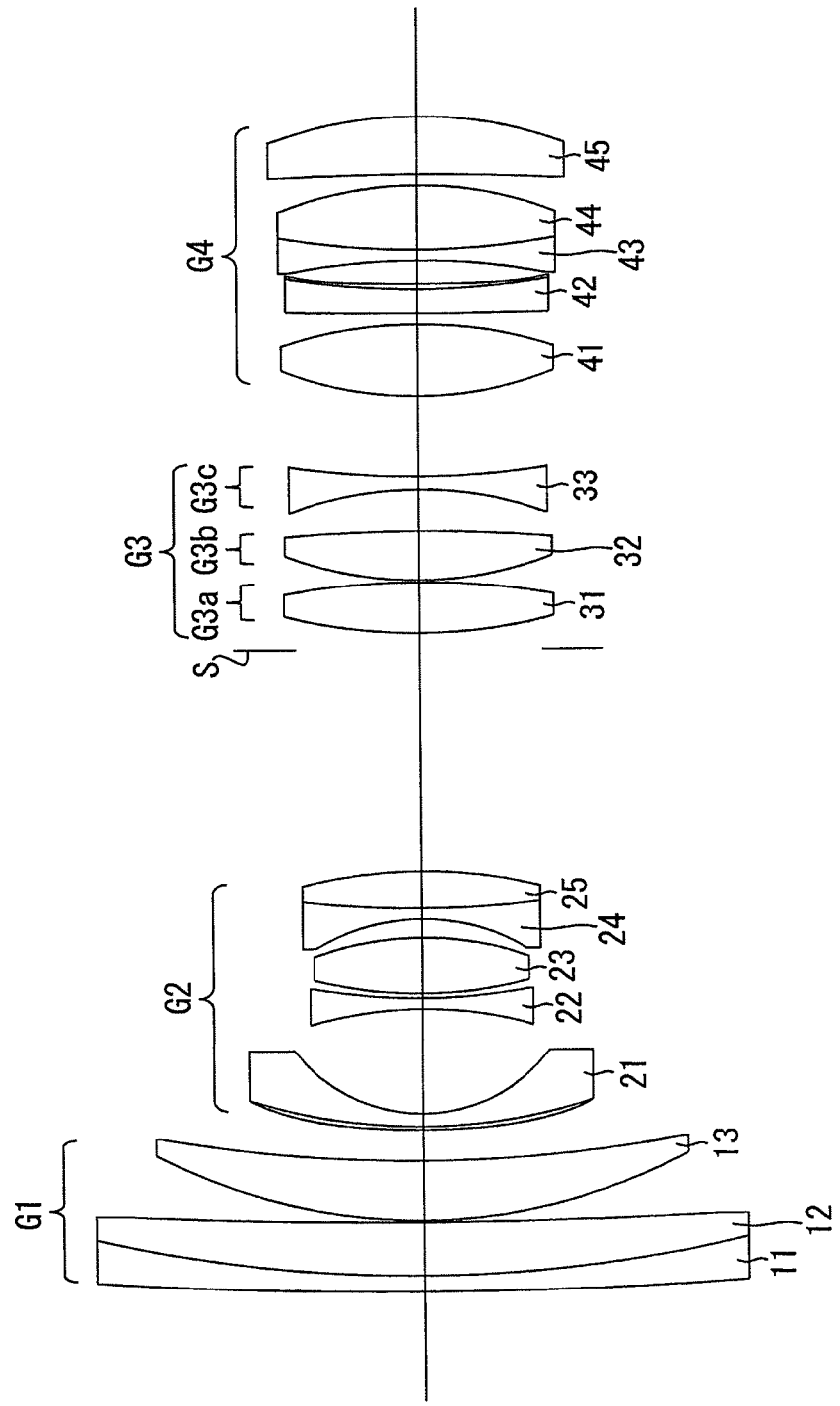
FIG. 33 shows a lens arrangement of a ninth numerical embodiment of a zoom lens system, according to the present invention, when focused on an object at infinity at the short focal length extremity.
Figure 34:
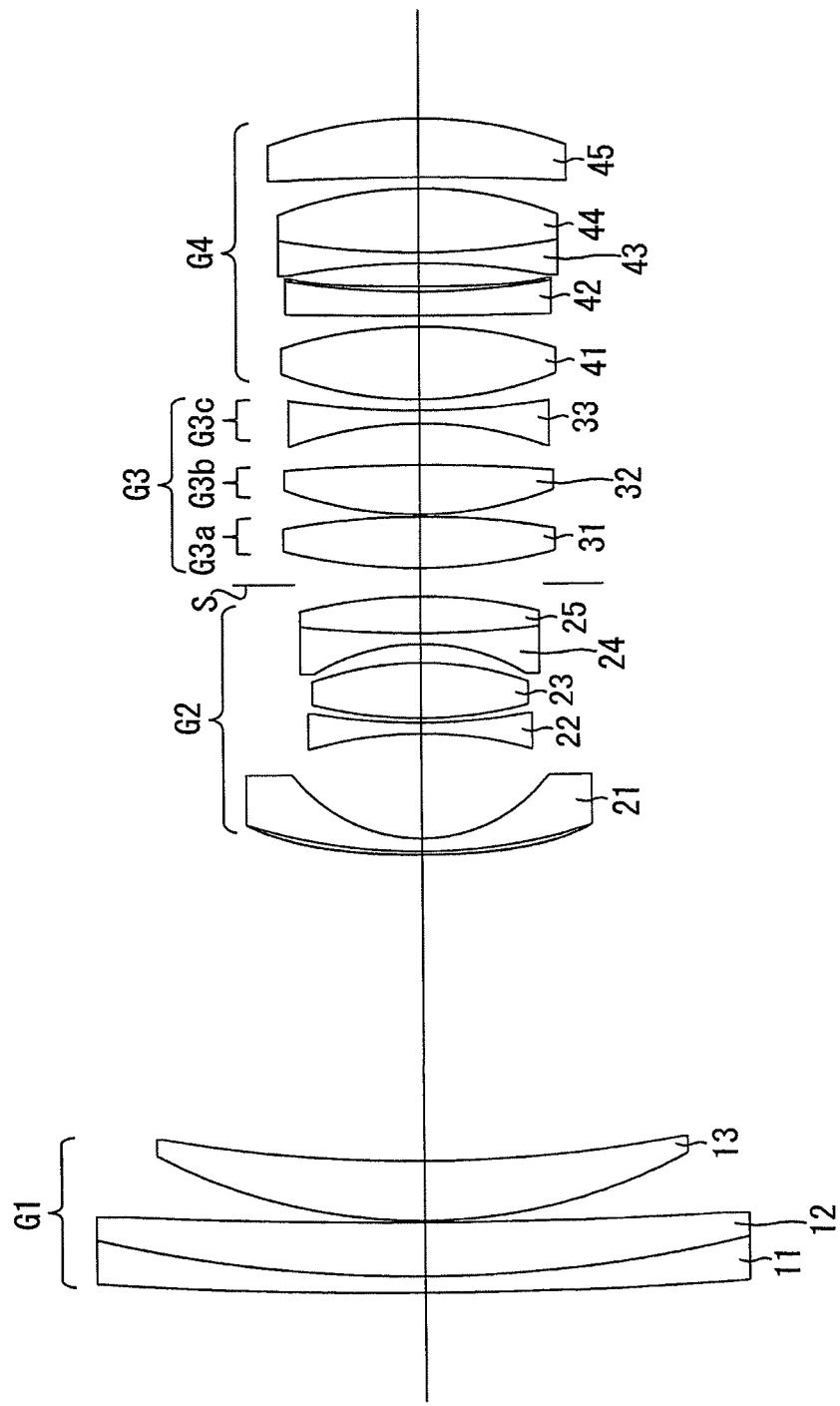
FIG. 34 shows a lens arrangement of the ninth numerical embodiment of a zoom lens system, according to the present invention, when focused on an object at infinity at the long focal length extremity.
Figure 35A:
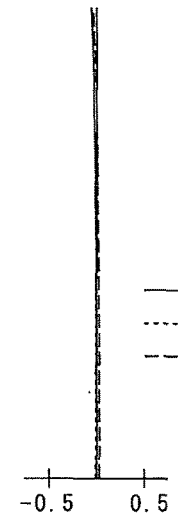
FIGS. 35A, 35B, 35C and 35D show various aberrations that occurred in the zoom lens system of FIG. 33.
Figure 35B:
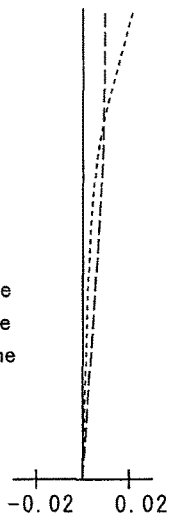
Figure 35C:
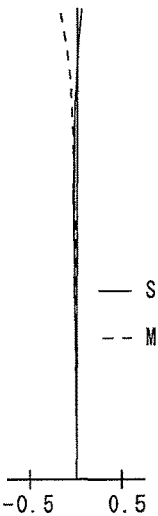
Figure 35D:
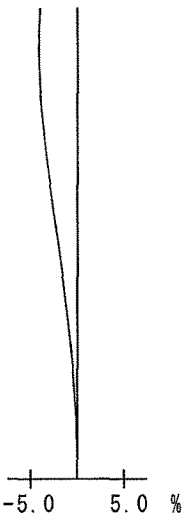
Figure 36A:
FIGS. 36A, 36B, 36C and 36D show various aberrations that occurred in the zoom lens system of FIG. 34.
Figure 36B:
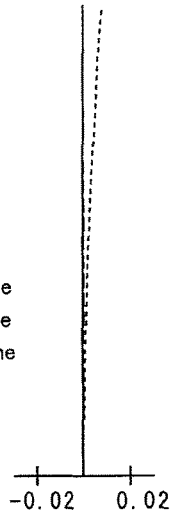
Figure 36C:
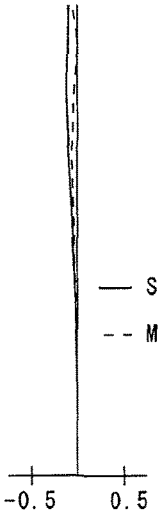
Figure 36D:
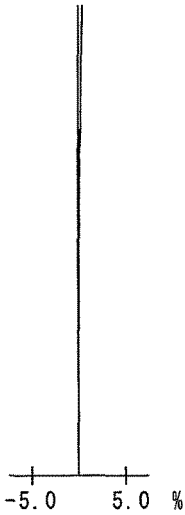

FIGS. 33 through 36D and Tables 33 through 36 disclose a ninth numerical embodiment of the zoom lens system according to the present invention. FIG. 33 shows a lens arrangement of the ninth numerical embodiment of the zoom lens system when focused on an object at infinity at the short focal length extremity. FIGS. 35A, 35B, 35C and 35D show various aberrations that occurred in the zoom lens system of FIG. 33. FIG. 34 shows a lens arrangement of the ninth numerical embodiment of the zoom lens system when focused on an object at infinity at the long focal length extremity. FIGS. 36A, 36B, 36C and 36D show various aberrations that occurred in the zoom lens system of FIG. 34. Table 33 indicates the surface data, Table 34 indicates various lens system data, Table 35 indicates aspherical surface data, and Table 36 indicates lens-group data.

The lens arrangement of the zoom lens system of the ninth numerical embodiment is the same as those of the second and third numerical embodiments, except for the following feature:

(1) The single positive lens element 32 of the second sub-lens group G3b is a single biconvex positive lens element.

TABLE 33

SURFACE DATA

| Surf. No. | R | d | N(d) | ν(d) |
|---|---|---|---|---|
| 1 | 455.149 | 1.500 | 1.84666 | 23.8 |
| 2 | 131.963 | 4.942 | 1.77250 | 49.6 |
| 3 | 546.122 | 0.150 | | |
| 4 | 52.585 | 5.486 | 1.75500 | 52.3 |
| 5 | 136.227 | d5 | | |
| 6* | 81.763 | 0.300 | 1.52972 | 42.7 |
| 7 | 53.214 | 1.200 | 1.88300 | 40.8 |
| 8 | 14.964 | 9.652 | | |
| 9 | −37.590 | 1.000 | 1.88300 | 40.8 |
| 10 | 57.045 | 0.426 | | |
| 11 | 40.427 | 5.097 | 1.65412 | 39.7 |
| 12 | −29.345 | 1.727 | | |
| 13 | −18.881 | 1.000 | 1.72916 | 54.7 |
| 14 | 101.578 | 3.360 | 1.84666 | 23.8 |
| 15 | −45.580 | d15 | | |
| 16 Diaphragm | ∞ | 1.500 | | |
| 17 | 50.631 | 4.684 | 1.77250 | 49.5 |
| 18* | −76.960 | 0.200 | | |
| 19 | 35.316 | 4.546 | 1.43875 | 95.0 |
| 20 | −152.635 | 3.818 | | |
| 21 | −34.238 | 1.200 | 1.83481 | 42.7 |
| 22 | 81.143 | d22 | | |
| 23 | 35.069 | 6.684 | 1.49700 | 81.6 |
| 24 | −41.334 | 1.000 | | |
| 25 | 527.008 | 2.200 | 1.84666 | 23.8 |
| 26 | 74.427 | 0.500 | 1.52972 | 42.7 |
| 27* | 565.323 | 2.115 | | |
| 28 | −65.060 | 1.000 | 1.90366 | 31.3 |

TABLE 33-continued

SURFACE DATA

| Surf. No. | R | d | N(d) | ν(d) |
|---|---|---|---|---|
| 29 | 75.191 | 5.880 | 1.49700 | 81.6 |
| 30 | −35.471 | 1.000 | | |
| 31 | −273.505 | 5.371 | 1.72000 | 43.7 |
| 32 | −40.134 | — | | |

The asterisk (*) designates an aspherical surface which is rotationally symmetrical with respect to the optical axis.

TABLE 34

ZOOM LENS SYSTEM DATA
Zoom Ratio: 2.94

| | Short Focal Length Extremity | Intermediate Focal Length | Long Focal Length Extremity |
|---|---|---|---|
| FNO. | 2.9 | 2.9 | 2.9 |
| f | 16.48 | 28.36 | 48.50 |
| W | 42.0 | 26.8 | 16.3 |
| Y | 14.24 | 14.24 | 14.24 |
| fB | 37.50 | 51.00 | 68.11 |
| L | 145.65 | 155.53 | 175.86 |
| d5 | 2.794 | 15.364 | 28.111 |
| d15 | 20.451 | 8.497 | 1.100 |
| d22 | 7.370 | 3.126 | 1.000 |

TABLE 35

ASPHERICAL SURFACE DATA

| Surf. No. | K | A4 | A6 | A8 |
|---|---|---|---|---|
| 6 | 0.000 | 0.2081E−04 | −0.4656E−07 | 0.2295E−09 |
| 18 | 0.000 | −0.1870E−05 | −0.2030E−08 | −0.6319E−11 |
| 27 | 0.000 | 0.2638E−04 | 0.7548E−08 | 0.2182E−10 |

| Surf. No. | A10 | A12 |
|---|---|---|
| 6 | −0.6611E−12 | 0.1090E−14 |
| 18 | 0.3177E−13 | 0.0000E+00 |
| 27 | −0.1747E−13 | 0.0000E+00 |

TABLE 36

LENS GROUP DATA

| Lens Group | 1st Surf. | Focal Length |
|---|---|---|
| 1 | 1 | 112.26 |
| 2 | 6 | −14.79 |
| 3 | 17 | 64.85 |
| 4 | 23 | 34.99 |

Numerical Embodiment 10

Figure 37:
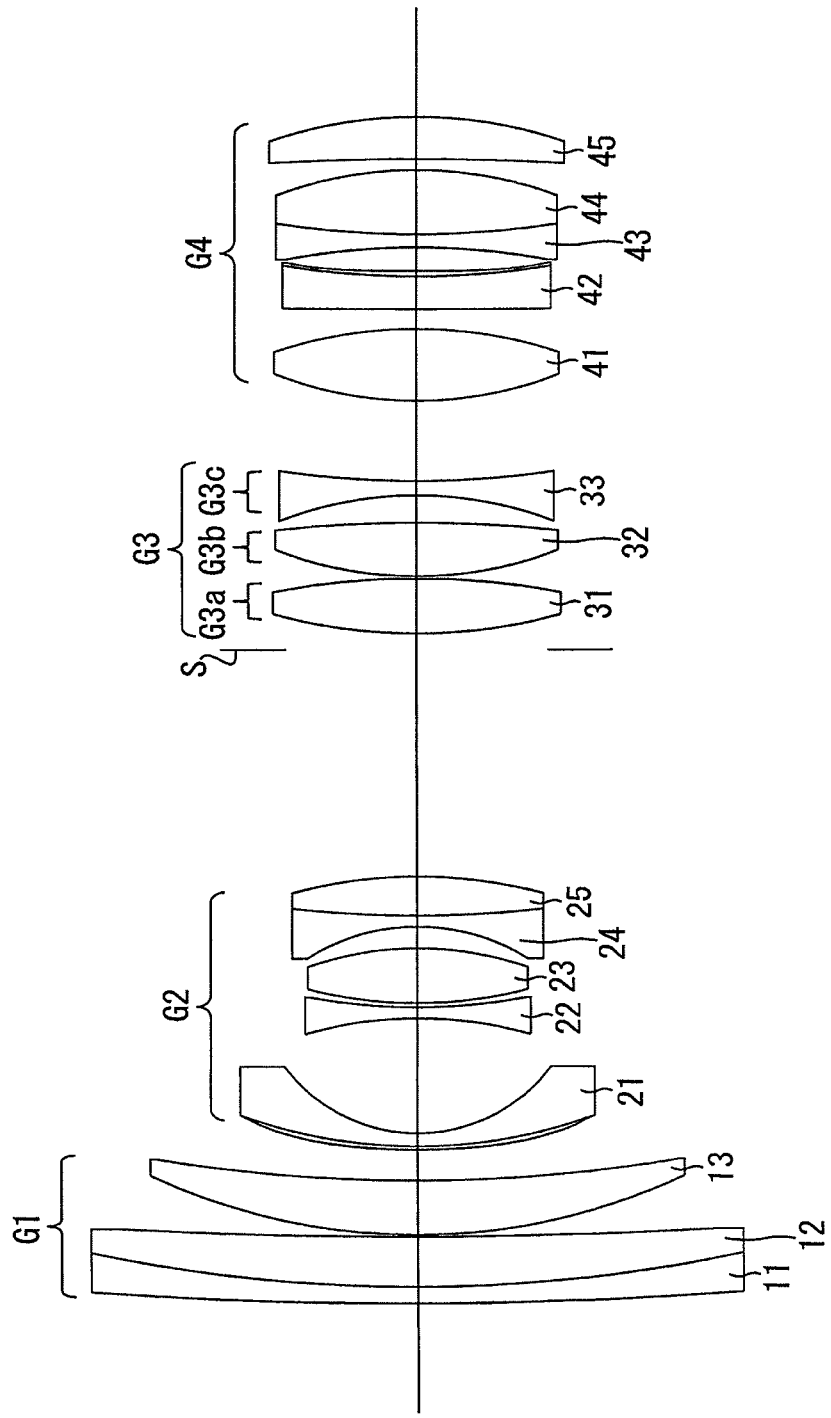
FIG. 37 shows a lens arrangement of a tenth numerical embodiment of a zoom lens system, according to the present invention, when focused on an object at infinity at the short focal length extremity.

FIGS. 37 through 40D and Tables 37 through 40 disclose a tenth numerical embodiment of the zoom lens system according to the present invention. FIG. 37 shows a lens arrangement of the tenth numerical embodiment of the zoom lens system when focused on an object at infinity at the short focal length extremity. FIGS. 39A, 39B, 39C and 39D show various aberrations that occurred in the zoom lens system of FIG. 37. FIG. 38 shows a lens arrangement of the tenth numerical embodiment of the zoom lens system when focused on an object at infinity at the long focal length extremity. FIGS. 40A, 40B, 40C and 40D show various aberrations that occurred in the zoom lens system of FIG. 38.

Table 37 indicates the surface data, Table 38 indicates various lens system data, Table 39 indicates aspherical surface data, and Table 40 indicates lens-group data.

The lens arrangement of the zoom lens system of the tenth numerical embodiment is the same as that of the ninth numerical embodiment.

TABLE 37

SURFACE DATA

| Surf. No. | R | d | N(d) | ν(d) |
|---|---|---|---|---|
| 1 | 418.750 | 1.500 | 1.84666 | 23.8 |
| 2 | 144.994 | 4.610 | 1.73400 | 51.5 |
| 3 | 502.019 | 0.150 | | |
| 4 | 58.067 | 5.007 | 1.74100 | 52.7 |
| 5 | 147.543 | d5 | | |
| 6* | 69.715 | 0.300 | 1.52972 | 42.7 |
| 7 | 48.179 | 1.200 | 1.88300 | 40.8 |
| 8 | 15.372 | 10.514 | | |
| 9 | −37.583 | 1.000 | 1.88300 | 40.8 |
| 10 | 54.399 | 0.388 | | |
| 11 | 40.915 | 4.998 | 1.65412 | 39.7 |
| 12 | −30.956 | 1.994 | | |
| 13 | −19.018 | 1.000 | 1.72916 | 54.7 |
| 14 | 105.592 | 3.578 | 1.84666 | 23.8 |
| 15 | −44.163 | d15 | | |
| 16 Diaphragm | ∞ | 1.500 | | |
| 17 | 50.343 | 5.005 | 1.77250 | 49.5 |
| 18* | −75.246 | 0.200 | | |
| 19 | 35.796 | 4.915 | 1.43875 | 95.0 |
| 20 | −121.993 | 2.507 | | |
| 21 | −34.785 | 1.322 | 1.83481 | 42.7 |
| 22 | 87.172 | d22 | | |
| 23 | 36.075 | 6.579 | 1.49700 | 81.6 |
| 24 | −41.808 | 1.797 | | |
| 25 | 1099.164 | 3.000 | 1.84666 | 23.8 |
| 26 | 76.179 | 0.500 | 1.52972 | 42.7 |
| 27* | 434.172 | 2.161 | | |
| 28 | −65.959 | 1.200 | 1.90366 | 31.3 |
| 29 | 85.855 | 5.867 | 1.49700 | 81.6 |
| 30 | −37.279 | 1.000 | | |
| 31 | −258.747 | 3.869 | 1.72000 | 43.7 |
| 32 | −41.854 | — | | |

The asterisk (*) designates an aspherical surface which is rotationally symmetrical with respect to the optical axis.

TABLE 38

ZOOM LENS SYSTEM DATA
Zoom Ratio: 2.94

| | Short Focal Length Extremity | Intermediate Focal Length | Long Focal Length Extremity |
|---|---|---|---|
| FNO. | 2.9 | 2.9 | 2.9 |
| f | 16.48 | 28.36 | 48.50 |
| W | 42.0 | 26.8 | 16.3 |
| Y | 14.24 | 14.24 | 14.24 |
| fB | 37.50 | 51.89 | 69.89 |
| L | 146.18 | 157.49 | 181.00 |
| d5 | 2.828 | 16.386 | 31.349 |
| d15 | 20.819 | 8.414 | 1.100 |
| d22 | 7.370 | 3.135 | 1.000 |

TABLE 39

ASPHERICAL SURFACE DATA

| Surf. No. | K | A4 | A6 | A8 |
|---|---|---|---|---|
| 6 | 0.000 | 0.1899E−04 | −0.3814E−07 | 0.2039E−09 |
| 18 | 0.000 | −0.2121E−05 | −0.2383E−08 | −0.9869E−11 |
| 27 | 0.000 | 0.2609E−04 | 0.8252E−08 | 0.4088E−10 |

TABLE 39-continued

ASPHERICAL SURFACE DATA

| Surf. No. | A10 | A12 |
|---|---|---|
| 6 | −0.5984E−12 | 0.9993E−15 |
| 18 | 0.4086E−13 | 0.0000E+00 |
| 27 | −0.7864E−13 | 0.0000E+00 |

TABLE 40

LENS GROUP DATA

| Lens Group | 1$^{st}$ Surf. | Focal Length |
|---|---|---|
| 1 | 1 | 130.34 |
| 2 | 6 | −15.14 |
| 3 | 17 | 64.19 |
| 4 | 23 | 37.21 |

The numerical values of each condition for each embodiment are shown in Table 41.

TABLE 41

| | Embod. 1 | Embod. 2 | Embod. 3 | Embod. 4 |
|---|---|---|---|---|
| Condition (1) | 6.57 | 7.77 | 7.69 | 8.45 |
| Condition (2) | 1.59 | 1.84 | 1.88 | 1.91 |
| Condition (3) | 1.00 | 1.09 | 1.14 | 2.22 |
| Condition (4) | 7.75 | 8.28 | 8.13 | 9.48 |
| Condition (5) | 81.6 | 81.6 | 81.6 | 81.6 |
| Condition (6) | 81.6 | 81.6 | 81.6 | 81.6 |

| | Embod. 5 | Embod. 6 | Embod. 7 | Embod. 8 |
|---|---|---|---|---|
| Condition (1) | 7.62 | 6.62 | 6.62 | 7.59 |
| Condition (2) | 1.88 | 1.91 | 1.91 | 1.69 |
| Condition (3) | 1.20 | 2.22 | 2.22 | 1.45 |
| Condition (4) | 8.04 | 7.91 | 7.91 | 8.20 |
| Condition (5) | 81.6 | 81.6 | 81.6 | 81.6 |
| Condition (6) | 81.6 | 81.6 | 81.6 | 81.6 |

| | Embod. 9 | Embod. 10 |
|---|---|---|
| Condition (1) | 6.81 | 7.91 |
| Condition (2) | 1.85 | 1.73 |
| Condition (3) | 1.40 | 1.34 |
| Condition (4) | 7.59 | 8.61 |
| Condition (5) | 94.9 | 94.9 |
| Condition (6) | 81.6 | 81.6 |

As can be understood from Table 41, the first through tenth numerical embodiments satisfy conditions (1) through (6). Furthermore, as can be understood from the aberration diagrams, the various aberrations are relatively well corrected.

The technical scope of the invention pertaining to the present invention would not be evaded even if a lens element or lens group which has, in effect, no optical power were to be added to a zoom lens system that is included in the technical scope of the invention pertaining to the present patent application.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens system comprising a positive first lens group, a negative second lens group, a positive third lens group and a positive fourth lens group, in that order from the object side, wherein distances between adjacent lens groups thereof change during zooming, wherein said third lens group includes a positive first sub-lens group, a positive second sub-lens group and a negative third sub-lens group, in that order from the object side, wherein said third sub-lens group includes a single negative lens element, and wherein the following conditions (1) and (2) are satisfied:

$$6.0 < f1Gp/fw < 9.0 \qquad (1), \text{ and}$$

$$1.3 < f3Gp/f4Gp < 2.0 \qquad (2), \text{ wherein}$$

fw designates the focal length of the entire zoom lens system at the short focal length extremity, f1Gp designates the focal length of said first lens group, f3Gp designates the focal length of said third lens group, and f4Gp designates the focal length of said fourth lens group.

2. The zoom lens system according to claim 1, wherein said first sub-lens group includes a single positive lens element, and said second sub-lens group includes a single positive lens element.

3. The zoom lens system according to claim 1, wherein said first sub-lens group includes a cemented lens having a positive lens element and a negative lens element, and said second sub-lens group includes a single positive lens element.

4. The zoom lens system according to claim 1, wherein the following condition (3) is satisfied:

$$0.95 < f3Ga/|f3Gc| < 2.5 \qquad (3), \text{ wherein}$$

f3Ga designates the focal length of said first sub-lens group, and f3Gc designates the focal length of said third sub-lens group.

5. The zoom lens system according to claim 1, wherein the following condition (4) is satisfied:

$$7.5 < f1Gp/|f2Gp| < 10.0 \qquad (4), \text{ wherein}$$

f1Gp designates the focal length of said first lens group, and f2GP designates the focal length of said second lens group.

6. The zoom lens system according to claim 1, wherein said third lens group includes at least one positive lens element that is provided with at least one aspherical surface thereon.

7. The zoom lens system according to claim 1, wherein the following condition (5) is satisfied:

$$vd3gp-\text{max} > 80 \qquad (5), \text{ wherein}$$

vd3gp-max designates the Abbe number with respect to the d-line of the positive lens element that has the maximum Abbe number with respect to the d-line out of said third lens group.

8. The zoom lens system according to claim 1, wherein the following condition (6) is satisfied:

$$vd4gp-\text{max} > 80 \qquad (6), \text{ wherein}$$

vd4gp-max designates the Abbe number with respect to the d-line of the positive lens element that has the maximum Abbe number with respect to the d-line out of said fourth lens group.

9. The zoom lens system according to claim 1, wherein said second lens group comprises a negative lens element having a concave surface on the image side, a biconcave negative lens element, a biconvex positive lens element, and a cemented lens having a biconcave negative lens element and a biconvex positive lens element, in that order from the object side.

10. A zoom lens system comprising a positive first lens group, a negative second lens group, a positive third lens group and a positive fourth lens group, in that order from the object side, wherein distances between adjacent lens groups thereof change during zooming, wherein said third lens group includes a positive first sub-lens group, a positive second sub-lens group and a negative third sub-lens group, in that order from the object side, wherein said third sub-lens group includes a single negative lens element, and wherein the following conditions (1) and (3) are satisfied:

$$6.0 < f1Gp/fw < 9.0 \qquad (1), \text{ and}$$

$$0.95 < f3Ga/|f3Gc| < 2.5 \qquad (3), \text{ wherein}$$

fw designates the focal length of the entire zoom lens system at the short focal length extremity, f1Gp designates the focal length of said first lens group, f3Ga designates the focal length of said first sub-lens group, and f3Gc designates the focal length of said third sub-lens group.

11. The zoom lens system according to claim 10, wherein said first sub-lens group includes a single positive lens element, and said second sub-lens group includes a single positive lens element.

12. The zoom lens system according to claim 10, wherein said first sub-lens group includes a cemented lens having a positive lens element and a negative lens element, and said second sub-lens group includes a single positive lens element.

13. The zoom lens system according to claim 10, wherein the following condition (4) is satisfied:

$$7.5 < f1Gp/|f2Gp| < 10.0 \qquad (4), \text{ wherein}$$

f1Gp designates the focal length of said first lens group, and f2GP designates the focal length of said second lens group.

14. The zoom lens system according to claim 10, wherein said third lens group includes at least one positive lens element that is provided with at least one aspherical surface thereon.

15. The zoom lens system according to claim 10, wherein the following condition (5) is satisfied:

$$vd3gp-\text{max} > 80 \qquad (5), \text{ wherein}$$

vd3gp-max designates the Abbe number with respect to the d-line of the positive lens element that has the maximum Abbe number with respect to the d-line out of said third lens group.

16. The zoom lens system according to claim 10, wherein the following condition (6) is satisfied:

$$vd4gp-\text{max} > 80 \qquad (6), \text{ wherein}$$

vd4gp-max designates the Abbe number with respect to the d-line of the positive lens element that has the maximum Abbe number with respect to the d-line out of said fourth lens group.

17. The zoom lens system according to claim 10, wherein said second lens group comprises a negative lens element having a concave surface on the image side, a biconcave negative lens element, a biconvex positive lens element, and a cemented lens having a biconcave negative lens element and a biconvex positive lens element, in that order from the object side.

\* \* \* \* \*